US006657543B1

(12) United States Patent
Chung

(10) Patent No.: US 6,657,543 B1
(45) Date of Patent: Dec. 2, 2003

(54) TRACKING METHOD AND SYSTEM, AS FOR AN EXHIBITION

(75) Inventor: Kevin Kwong-Tai Chung, Princeton, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 09/975,370

(22) Filed: Oct. 11, 2001

Related U.S. Application Data

(60) Provisional application No. 60/240,748, filed on Oct. 16, 2000, provisional application No. 60/243,640, filed on Oct. 26, 2000, provisional application No. 60/245,596, filed on Nov. 3, 2000, provisional application No. 60/248,454, filed on Nov. 14, 2000, provisional application No. 60/255,162, filed on Dec. 13, 2000, provisional application No. 60/260, 849, filed on Jan. 10, 2001, provisional application No. 60/340,017, filed on Jul. 9, 2001, provisional application No. 60/305,686, filed on Jul. 16, 2001, and provisional application No. 60/323,514, filed on Sep. 19, 2001.

(51) Int. Cl.[7] ............................................. G08B 23/00
(52) U.S. Cl. .............................. 340/573.1; 340/572.1; 340/572.7; 340/572.8; 455/414
(58) Field of Search ........................ 340/573.1, 572.1, 340/572.7, 572.8; 455/414

(56) References Cited

U.S. PATENT DOCUMENTS

| | | | | |
|---|---|---|---|---|
| 4,968,873 A | * | 11/1990 | Dethloff | 235/380 |
| 5,566,327 A | * | 10/1996 | Sehr | 707/104.1 |
| 5,675,628 A | * | 10/1997 | Hokkanen | 455/433 |
| 6,077,106 A | * | 6/2000 | Mish | 439/500 |
| 6,078,928 A | * | 6/2000 | Schnase et al. | 707/104.1 |
| 6,112,240 A | * | 8/2000 | Pogue et al. | 709/224 |
| 6,287,765 B1 | * | 9/2001 | Cubiccitti | 435/6 |
| 6,366,777 B1 | * | 4/2002 | Uusitalo | 455/433 |
| 6,418,372 B1 | * | 7/2002 | Hofmann | 701/209 |
| 6,427,073 B1 | * | 7/2002 | Kortesalemi et al. | 455/414 |

OTHER PUBLICATIONS

Frontline Solutions, "RFID Standards Buoy Packaging", Jul. 2001, 3–Pages.
Frontline Solutions, "Packagers Think Outside The Box", May 2001, 3–Pages.
Frontline Solutions, "RFID Baggage Tracking Solution Helps Keep SFIA Secure", Jul. 2001, 4–Pages.
Frontline Solutions, "Standard Response", Jul. 2001, 1–Page.

* cited by examiner

*Primary Examiner*—Daryl Pope
(74) *Attorney, Agent, or Firm*—Dann, Dorfman, Herrell, Skillman, P.C.

(57) ABSTRACT

A system and method are useful for conducting an exhibition at which visitors visit a plurality of booths or stations. A smart tag issued each visitor includes at least an electronic memory from which information from the memory may be provided and/or information may be received and stored in the memory. Stored information may include visitor information, exhibitor information, visit information, product/service information and data items. Smart tag control units and antenna arrays at the stations communicate with the smart tags and communicate directly or indirectly with one or more processors that process the information.

75 Claims, 11 Drawing Sheets

SYNTHESIZED VOICE GREETING TO CALL FOR VISITOR TO THE SPECIFIC KIOSK

TRACKING METHOD AND SYSTEM, AS FOR AN EXHIBITION

This Application claims the benefit of:

U.S. Provisional Application Serial No. 60/240,748 filed Oct. 16, 2000,

U.S. Provisional Application Serial No. 60/243,640 filed Oct. 26, 2000,

U.S. Provisional Application Serial No. 60/245,596 filed Nov. 3, 2000,

U.S. Provisional Application Serial No. 60/248,454 filed Nov. 14, 2000,

U.S. Provisional Application Serial No. 60/255,162 filed Dec. 13, 2000,

U.S. Provisional Application Serial No. 60/260,849 filed Jan. 10, 2001,

U.S. Provisional Application Serial No. 60/304,017 filed Jul. 9, 2001,

U.S. Provisional Application Serial No. 60/305,686 filed Jul. 16, 2001,

U.S. Provisional Application Serial No. 60/323,514 filed Sep. 19, 2001, and

U.S. patent application Ser. No. 09/854,722 filed May 14, 2001.

The present invention relates to a tracking arrangement and, in particular, to a tracking method and system useful in various environments.

In a exhibition, convention, trade show, product show or similar environment (usually referred to as an exhibitions), many visitors may visit any number of displays, exhibits, booths, shows, product areas, lectures, seminars, and the like (usually referred to as "booths" or "stations"). At each place visited the visitor may collect, order and/or request literature, catalogs, sales brochures, data sheets, samples, models, products, additional information, and the like. In addition, each sales person, manufacturer, operator, exhibitor or other proprietor of a booth or display (usually referred to as "exhibitors") desires to meet its customers, potential customers and other interested persons (usually referred to as "visitors") face-to-face and discuss their respective interests, products and applications and the like.

The visitors desire to receive the information, samples and the like requested at each booth and the exhibitors desire to have a record of the visitors, their requests and interests. These desires were addressed by paper forms or informal notes, or by the exchange of business cards. Such paper records tended to be cumbersome to use and error prone, and often took a considerable time to process or were often misplaced or lost.

Issuing to each visitor pre-printed mailing labels or an embossed plastic card from which imprints could be made mechanically provided some degree of uniformity, but the paper records therefrom were also subject to delay and loss. The desire to maintain a complete, accurate and up to date record of the visitors and requests was addressed by automated or automatic methods of providing such record. However, conventional methods, even some of the more automated methods, all have shortcomings that result in less than the desired record being provided.

More sophisticated automatic methods employed bar-coded labels and/or magnetic stripe cards, each with suitable readers. While the cost of such labels and cards is low, so is the information that can be embedded or coded in either of these media. In addition, most readers are read-only devices and cannot store any additional information in the bar-code label or magnetic stripe card. Moreover, the lack of memory capacity in the media tended to make the readers more complex and more expensive, and the information that could be printed out is consequently limited.

Moreover, both bar-code and magnetic stripe media require a "line-of-sight" or direct communication path between media and reader, and the reliability of correct reading is about 80–90%, as anyone who has gone through a store check-out bar-code reader or used a magnetic stripe credit card reader will recognize. Repeated passes of the bar-code label in front of the bar-code reader and repeated swipes of the credit card through the card reader create delay and annoyance, and can produce record errors. Both are very inconvenient when inserted into a plastic badge holder that is clipped or pinned to the visitor, because the bar-code label or magnetic stripe card must either be repeatedly removed from and re-inserted into the badge holder and/or the bar-code reading error rate greatly increases due to the badge holder.

Electronic tracking using radio frequency identification (RFID) tags is one way to overcome the disadvantages of the prior art bar-code and magnetic stripe approaches. Prior art systems typically do not track visitors along the path of their visit and/or do not have reliable, essentially 100% correct reader performance, essentially without the need for human intervention, as is desirable for providing complete and accurate records.

Accordingly, there is a need for a tracking system that can track visitors to various exhibit stations, and that can facilitate quickly and accurately providing requested information to visitors. It would also be desirable that such system that does not require line-of-sight readers.

To this end, the method of the present invention for conducting an exhibition wherein a visitor having a smart tag visits a plurality of stations comprises:

associating a smart tag reader with each one of a plurality of stations for providing and/or receiving information-bearing signals in a smart tag format, storing exhibitor information in an electronic memory associated with a station, issuing a visitor smart tag containing visitor information, the visitor smart tag for providing and/or receiving information-bearing signals in the smart tag format, communicating information-bearing signals between the visitor smart tag and the smart tag reader of a particular station when the visitor smart tag is proximate that particular station, wherein visitor information from the visitor smart tag is stored in the particular station and/or exhibitor information from the particular station is stored in the visitor smart tag; and processing visitor information and exhibitor information from at least one of the visitor smart tag and the plurality of stations for providing a record thereof.

According to another aspect of the invention, a system wherein a visitor having a smart tag visits a plurality of stations comprises:

a smart tag reader associated with each one of a plurality of stations for providing and /or receiving information-bearing signals in a smart tag format;

means for storing exhibitor information in an electronic memory associated with a station;

means for issuing a visitor smart tag containing visitor information, the visitor smart tag for providing and/or receiving information-bearing signals in the smart tag format;

means for communicating information-bearing signals between the visitor smart tag and the smart tag reader of a particular station when the visitor smart tag is proximate that particular station, wherein visitor information from the visitor smart tag is stored in the particular station and/or exhibitor information from the particular station is stored in the visitor smart tag; and means for processing visitor information and exhibitor information from at least one of the visitor smart tag and the plurality of stations for providing a record thereof.

BRIEF DESCRIPTION OF THE DRAWING

The detailed description of the preferred embodiments of the present invention will be more easily and better understood when read in conjunction with the FIGURES of the Drawing which include.

Figure 1:
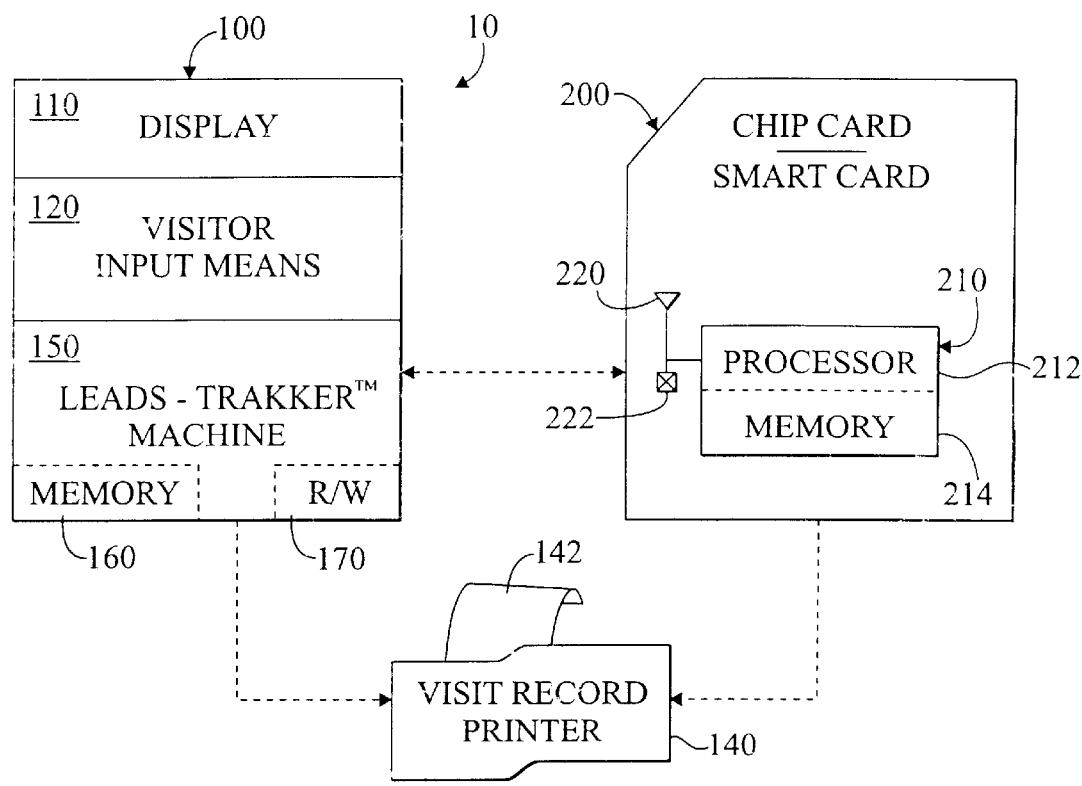
FIG. 1 is a schematic block diagram illustrating an example embodiment of a tracking system in accordance with the invention.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similar elements may be shown in the same figure designated by different "dash numbers" such as X-1, X-2, and so on. It is noted that, according to common practice, the various features of the drawing are not to scale, and the dimensions of the various features are arbitrarily expanded or reduced for clarity.

DESCRIPTION OF THE PREFERRED EMBODIMENT

A system according to the invention is useful for identifying a visitor at or to a plurality of booths or stations. A smart tag is issued to or associated with each visitor, for example, by being attached to a badge or carried in a pocket or purse, and is detected or read at each booth or station. The smart tag includes at least an electronic memory coupled to an antenna by which information from the memory may be transmitted and/or information may be received and stored in the memory. Information stored in the smart tag memory may include or relate to, for example, the visitor's identification, interests and/or requested data items.

Smart tag control units (e.g., readers and/or writers) and antenna arrays at the booths or stations communicate with the smart tags and may communicate directly or indirectly with one or more processors that process the information. Smart tag control units and antenna arrays at one or more exits or check out stations communicate with the smart tags and communicate directly or indirectly with one or more processors that process the information, and may provide a record of the visitor's visit to the exhibition to the visitor and/or exhibitors, and/or may initiate the providing of data items.

As used herein, the following terms are used to include but are not limited to:

"Booth" and/or "station" are used to refer to any booth, station, exhibit, display, product area, seminar, lecture, demonstration, show, performance, and the like that one or more visitors may visit at an exhibition.

"Exhibition" is used to refer to any exhibition, group or collection of exhibits or displays, convention, trade show, product show, conference, seminar, museum, or similar environment in which information, education, products, services and/or anything else of interest to visitors is exhibited, displayed, presented or otherwise made available at a plurality of booths or stations, usually by plural exhibitors or presenters.

"Exhibitor" is used to refer to each sales person, manufacturer, operator, exhibitor, lecturer, presenter, performer, or a proprietor of a booth or station.

"Data item" is used to refer to each and all literature, catalog, sales brochure, data sheet, sample, model, product, additional information, and the like that a visitor may request, order, pick up or otherwise collect ant any exhibit and/or exhibition.

"Electronic gate" is used to refer to an array of antenna in combination with a smart tag reader/writer that communicates with a smart tag via the antenna array, and which may also include a display, annunciator or other device for providing information in human perceivable form. The antenna array may be disposed at an entry point or other location of a booth or exhibit for receiving information produced from a smart tag that is within its detection region and for transmitting information to be stored in the memory of a smart tag within its detection region.

"Smart tag" is used to refer to an article that includes at least an electronic memory wherein information from the memory may be transmitted and/or information may be received and stored in the memory. A "wireless" type smart tag including an antenna is preferred, wherein the information is electromagnetically coupled from or to the antenna over a distance or range. However, a "contact" type smart tag, wherein the information is electrically coupled through physical electrical connections made to contacts on the smart tag, may also be utilized, although it is less convenient.

"Visitor" is used to refer to customer(s), potential customer(s), client(s), potential client(s), colleague(s), participant(s), and/or any other interested person(s) and/or audience at or to an exhibit and/or exhibition.

The system and method of the invention may be utilized, for example, to facilitate an exhibitor's desire to distribute data items relating to its products and/or services, to meet a visitor face-to-face and discuss their respective interests, products and applications and the like, and to provide data items that are or might be of interest, and any other interest, as well as the independent, mutual and/or reciprocal interests of visitors.

FIG. 1 is a schematic block diagram illustrating an example embodiment of a tracking system in accordance with the invention. Electronic gate 100, also referred to as a LEADS-TRAKKER™ machine or gate, is located at a booth or station 10. Electronic gate 100 preferably includes a display 110, visitor data input means 120 and a processor 150 which includes a reader and/or writer for communicating with a smart tag 200. Display 110 typically includes a visual display device such as a video or computer monitor, LCD display, cathode ray tube, dot-matrix display, touch screen display, or any other display providing information in a visual form that can be perceived (e.g., seen) by a person. Display 110 may also include an annunciator, loudspeaker, or other sound transducer for providing audible information that can be perceived (e.g., heard) by a person. Visitor input means 120 typically includes a keypad, keyboard, touch pad, light pen, or other device by which a visitor may enter information into LEADS-TRAKKER™ electronic gate/machine 100.

Processor 150 includes a smart tag reader 170 for at least receiving and decoding information from a smart tag 200 that is within its detection region. Preferably, smart tag reader 170 receives information transmitted by smart tag 200 via an antenna or array of antenna, i.e. when smart tag 200 is within a space in which electromagnetic radiation from its antenna 220 is effective to be received by an antenna array of the smart tag reader. In addition, and preferably, the smart tag reader is a smart tag reader/writer that also encodes and transmits information electromagnetically via its antenna array effective to be received by antenna 220 of smart tag 200 when in the detection region. Such smart tag readers and reader/writer 170 may be of any suitable type including commercially available conventional reader/writers.

Decoded information received from smart tag 200 is displayed by display 110, typically as a greeting to a visitor that may be personalized by including all or part of the information read from the visitor's smart tag 200 in the greeting. The greeting may be visual or audible or both. The visitor (or the exhibitor or other person) may enter information requests and the like, i.e. requests for data items, via input means 120 which information is stored in a memory 160 associated with processor 150 or is transmitted to smart tag 200 via reader writer 170. In either case, information from smart tag 200 and information entered via input means 120 are related and stored in a memory, and typically provide a record of a visitor's visit to booth or station 10. The memory in which such visit record information is stored may be memory 214 of smart tag 200, or may be memory 160 of LEADS-TRAKKER™ machine 150, or both.

Smart tag 200 includes an electronic device 210 and an electrical device such as antenna 220 and/or electrical contacts 222 by which information is provided and/or received. Electronic device 210 typically includes an electronic memory 214 in which information is stored and a processor 212.. Processor 212 retrieves and codes information produced from memory 214 in a form suitable for communication via antenna 220 and/or electrical contacts 222. Preferably, processor 210 also codes and provides information received via antenna 220 and/or electrical contacts 222 and stores such information in memory 214.

The coding provided by processor 210 may include modulating and demodulating signals for radio frequency communication and/or converting information to suitable digital and/or analog signal format for communication via antenna 220 and/or contacts 222, and may also include converting received information to a form, typical a digital format, for storage in memory 214. Processor 210 may also perform signal synchronization, authorization verification and/or encryption/decryption as may be deemed necessary and/or convenient.

Information including related information from smart tag 200 and from electronic gate 100, e.g., typically information that is a record of a visit to a booth or station 10 or to plural booths or stations 10, may be provided in tangible form, such as being printed on a paper 142 by a printer 140. Such information may be produced from memory 140 of processor 150 or from memory 214 of smart tag 200, or both. Printer 140 may be a printer to paper, or may be an electronic writing device that provides the information on other tangible media, such as floppy disks, CDs and other electronic media. Printer or other media writer 140 may be associated with a particular station 10 or electronic gate 100, or may be associated with a check-out station remote from station 10. Where printer 140 is remote from station 10, information is communicated thereto by conventional communication means including but not limited to wire, cable, optical fiber, local area network (LAN), wide area network (WAN), radio transmission, optical transmission or other suitable means, or any combination thereof, with or without one or more communication hubs.

Figure 2:
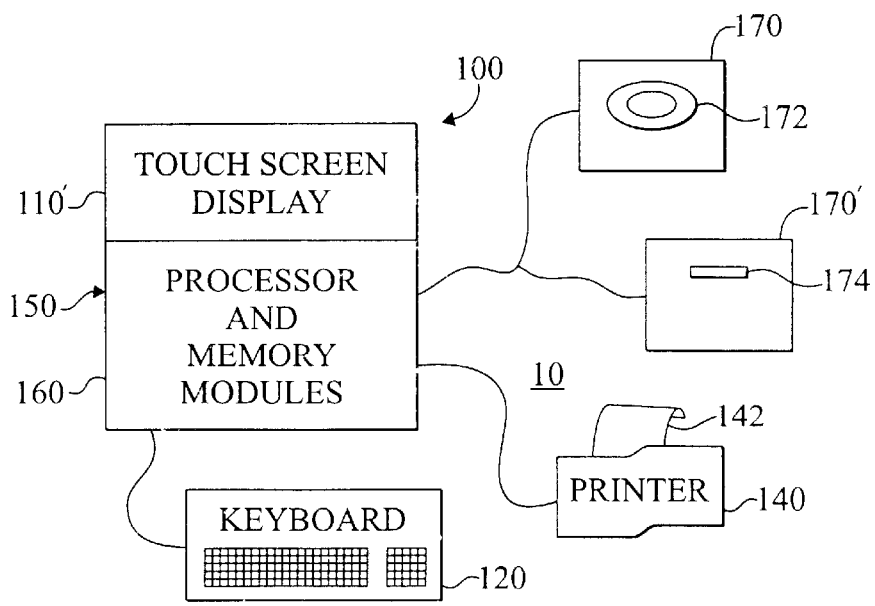
FIGS. 2 and 3 are schematic diagrams illustrating an example of a station of the tracking system in accordance with the invention.

FIG. 2 is a schematic block diagram illustrating an example embodiment of a station 10 of the tracking system in accordance with the invention. Electronic gate or LEADS-TRAKKER™ machine or gate 100 therein shows further detail of the embodiment of FIG. 1. Touch screen display 110' provides an easy to use and convenient combined display and input means through which a greeting or other message may be provided to a visitor and information and requests may be received from the visitor. Keyboard 120, which may be optional in this embodiment, such as a standard computer keyboard, provides an alternative input means through which the visitor and/or exhibitor (or other person) may enter information into processor 150.

Smart tag reader writer 170 is illustrated as a reader/writer for wireless smart tags 200 and so includes an antenna or antenna array 172, which is preferable. Alternatively or additionally, smart tag reader writer 170' is illustrated as a reader/writer for contact-type smart tags 200 and so includes slot 144 into which a smart tag 200 is inserted to be read or written to. Reader/writer 170, 170' may include a collection or "take-in" mechanism for collecting smart tags when that reader/writer is utilized where smart tags are to be collected. Printer 140 or another media writing device is directly associated with electronic gate 100 of FIG. 2.

Figure 3:
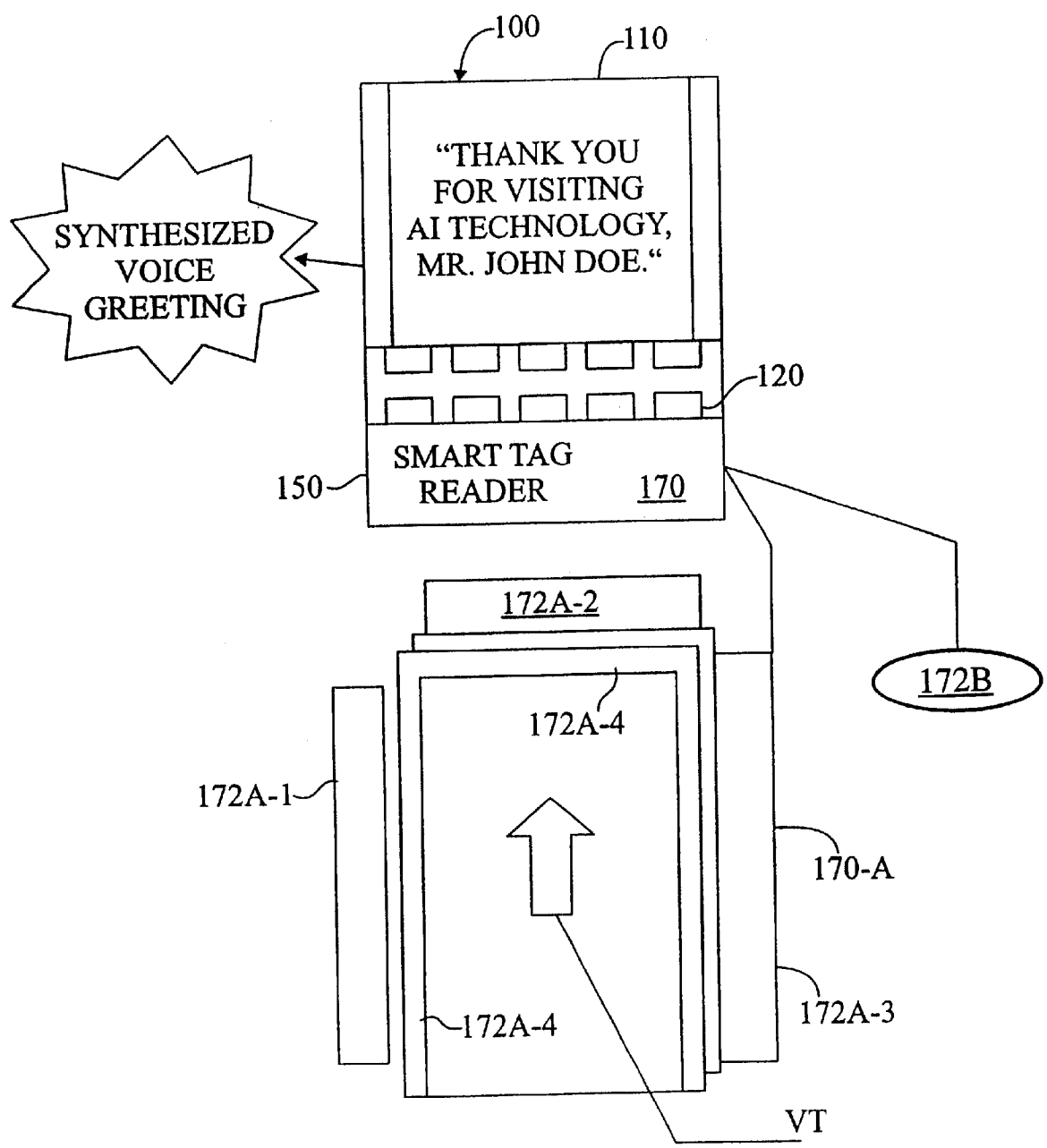

FIG. 3 is a schematic diagram illustrating an example of a station 10 in accordance with the invention. Electronic gate 100 may be included in a "kiosk" type arrangement in which display 110, keyboard 120 and smart tag reader 170 are contained in a common housing. As illustrated by the "star-burst" to the left of gate 100, display 110 provides an audible greeting wherein speech is synthesized by processor 150 in response to information read from the visitor's smart tag 200. Speech or voice synthesizers are available from many commercial sources and in many languages. The visitor's language preference may be obtained at registration and stored in his smart tag badge and then read from the smart tag to produce the audible greeting in the visitor's language.

Also as illustrated, processor 150 processes information from smart tag 200 and information entered at electronic gate 100 to provide a visual greeting. For example, the visitor's name "John Doe" read from smart tag 200 is combined with the name of the company "AI Technology" utilizing gate 100, which is entered via keyboard 120. Processor 150 combines those names with a script, which may also have been entered by the company via keyboard 120, to produce the greeting, "Thank you for visiting AI Technology, Mr. John Doe."

Electronic gate 100 may employ various antenna for communicating electromagnetically with smart tag 200. For example, an array of antenna 172A are disposed about an entranceway 174 and may include antenna on the sides and top thereof and/or surrounding the opening through which a visitor VT passes. Antennas 172A-1 through 172A-4 of antenna array 172A are represented by rectangles and visitor VT is represented by a large arrow. Preferably, antenna array 172A is arranged for detecting smart tags 200 within entranceway 174 with close to 100% reading rate irrespective of the orientation of smart tag 200. Alternatively, gate 100 may employ a simple loop antenna 172B preferably positioned for reliably reading smart tags 200 in a preferential orientation, such as clipped to the front of a visitor.

Each station 10 includes a control unit for communicating with smart tags when the smart tag is within the detection region of the control unit and its associated antenna array 172. Each antenna array 172 typically includes a plurality of antenna, typically loop antenna, arranged so that a smart tag within the detection region will be detected with substantially 100% reliability. The antenna array typically produces and/or is responsive to electromagnetic fields having a component in each of three orthogonal directions, or at least in directions coupling with the antenna of the smart tag in any orientation it may be in when in the detection region.

Each electronic gate 100 has or is assigned an identification number that is associated with the exhibitor of that station 10 (exhibitor identification number) in a relational data base of the processor 150 (or a local or central processor LP, CP), and which enables access to exhibitor information such as name, address, telephone and facsimile numbers, e-mail and web site addresses, business and produce/service summaries and the like. In addition, the exhibitor may associate electronic versions of its catalogs, data sheets, literature and other materials with its exhibitor number so that such materials may be retrieved electronically as needed at an exhibition, e.g., at a station 10 or at check out) by using the exhibitor number to associate the relevant materials via the relational database.

In the arrangement of FIG. 3, a printer 142 is associated with the electronic gate 100 at station 10, although other printers or other devices providing a tangible record of a visitor's visits could be associated with the station 100 and/or other stations 10 in a tracking system.

Figure 4:
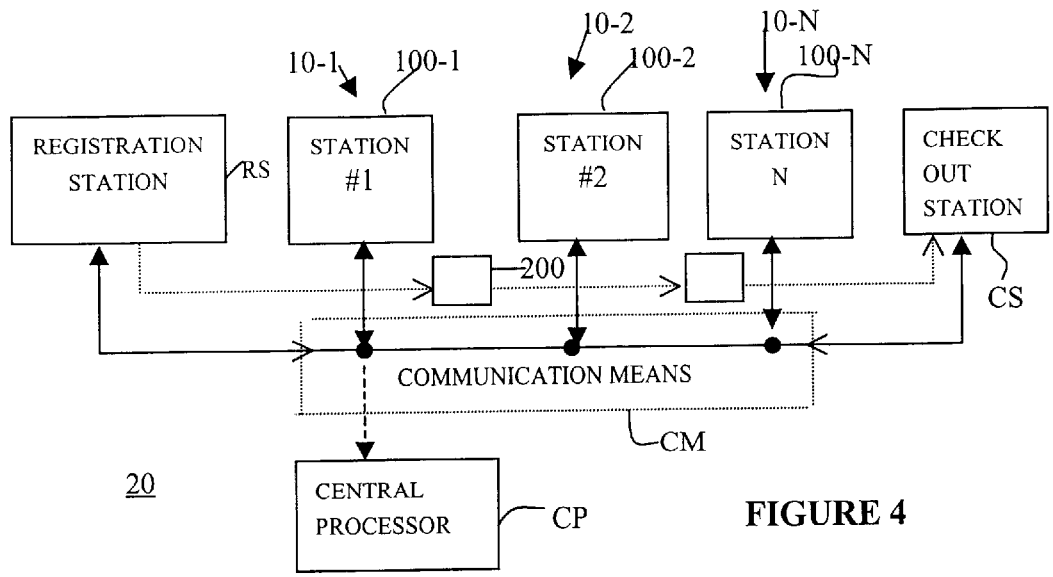
FIG. 4 is a schematic block diagram also illustrating an example embodiment of a tracking system in accordance with the invention.

FIG. 4 is a schematic block diagram also illustrating an example embodiment of a tracking system 20 including a plurality of stations 10-1 through 10N in accordance with the invention, as described above. Registration station RS is for receiving information relating to each visitor, whether by advance registration or on-site registration, and coding that information into the memory of a smart tag 200 that is issued to each visitor, typically as part of an identification badge displaying the visitor's name and affiliation in human readable form. Visitor advance registration may be by mail-in forms or via the Internet by visiting a web site to register for the exhibition. On site registration may include reading of completed forms, such as by optical character readers, or by keyboard entry of visitor information.

As the visitor moves through the exhibition past the various stations 10-1 through 10-N thereof, his identification badge smart tag 200 is read at each station visited by the respective electronic gate or LEADS-TRAKKER™ machine or gate 100 thereat. The information so read from the visitor's smart tag 200 may be stored in a memory of the electronic gate 100 and /or may be communicated to a central computer or processor CP via any suitable communication link. Information relating to the visitor's visit to each station, such as by responding to queries by pushing buttons or entering data via a keyboard or other data input device, is also either stored in the electronic gate 100 or is communicated to the central computer, or is transmitted to and stored in the smart tag 200, for later retrieval and use.

When the visitor has completed his visit, i.e. has visited those of stations 10-1 through 10-N that he desired to visit or that time permitted a visit, the visitor then utilizes his smart tag 200 to check out of the exhibition at check out station CS. Check out station CS provides the visitor with a tangible record of his visit to any desire degree of detail. For example, a simple form of such tangible record may include the visitor's identification and a list of stations visited. A more comprehensive form of the tangible record may include the visitor's identification, a list of the stations visited, a list of the data items requested at each station, and, with advance entry of data items or of links to the data items by the exhibitors, the data items requested.

Moreover, such tangible record may be any one or more of a printed document, a computer floppy disk, a computer CD-ROM disk, or any other desired medium. Where the tangible record is a computer readable medium, such as a floppy disk or a CD-ROM disk, the medium, the computer readable files thereon may include files directing access to either a central web site or to particular exhibitor's web sites at which the visitor may access and/or retrieve data items.

In addition to providing a record of a visitor's visit to the visitor, system 20 can also provide a record of the visitors who visited each station 10-1 through 10-N as well as a record of the data items requested by each visitor. Such records are very useful to an exhibitor for identifying potential and present customers and/or clients and their interests, their requests, and any other information gathered. Such visit records can be provided to each exhibitor in any of the formats that tangible records can be provided to the visitors. Moreover, such records may be made available to exhibitors as frequently as the information is transferred to central processor CP from electronic gates 100-1 through 100-N via communication means CM.

Communication between the registration station RS, the various stations 10-1 through 10-N, checkout station CS and central processor CP may be via any suitable communication means CM including but not limited to wire, cable, optical fiber, local area network (LAN), wide area network (WAN), radio transmission, optical transmission or other suitable means, or any combination thereof, with or without one or more communication hubs. Such communication may be in real time, be periodic or a periodic, and may include one or more communications, and may utilize any suitable format or protocol, such as the RS485 and/or RS232 standards. Where information is written to and stored in smart tag 200 at each of stations 10-1 through 10-N visited, communication may be by check out station CS reading the information so stored in smart tag 200. Smart tag 200 may be collected by check out station CS, thereby permitting reuse of the smart tags 200 for a subsequent visitor at a given exhibition or at another exhibition.

Figure 5A:
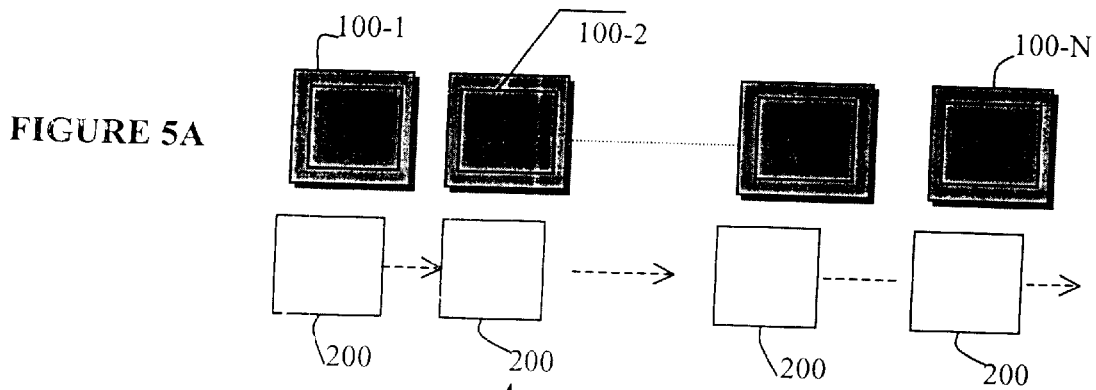
FIGS. 5A and 5B are schematic block diagrams illustrating examples of one or more stations and/or operations thereof including the present invention and useful with a system according to the present invention.
Figure 5B:
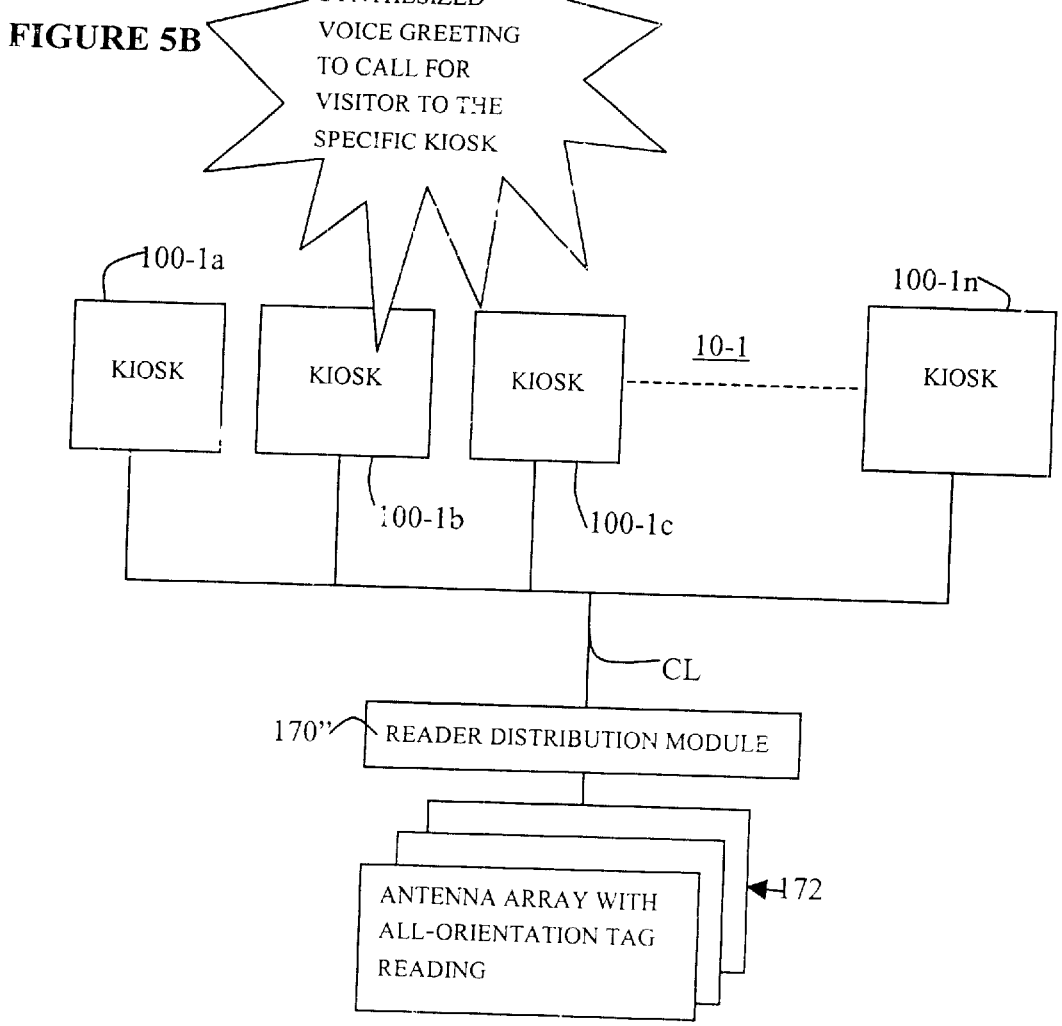

FIGS. 5A and 5B are schematic block diagrams illustrating examples of one or more stations 100-1 and/or operations thereof including the present invention and useful with a system 20 according to the present invention. Electronic gates 1001 through 100-N are, for example, interactive kiosks (i.e have a display and input device, as described above) at respective stations 10-1 through 10-N. In the arrangement of FIG. 5A, the kiosks 100-1 through 100-N are not linked by a communication means to a central computer CP, but communicate information that is stored in the memory of smart tag 200 as it is proximate electronic gates 100-1 through 100-N, i.e. within the detection region of the antenna thereof. Dashed lines indicate movement of smart tag 200 past various stations 100-1, . . . 100-N. Smart tag 200 stores information that is eventually read out and provided to the visitor and/or to exhibitors in the form of a tangible record.

In the arrangement of FIG. 5B, plural interactive kiosks 100-1a, 100-1b, . . . 100-1n at station 10-1 are coupled by communication link CL to a smart tag reader/writer distribution module 170" to a common array antenna 172. When a visitor enters station 10-1, his smart tag 200 is detected by reader/writer 170" via antenna array 172 and he is greeted by the next available one of kiosks 100-1a, . . . 100-1n. As a result, plural visitors may be accommodated at a station 10-1 at a particular time because each may interact with a particular one of the available interactive kiosks 100-1a, . . . 100-1n, e.g., via a keyboard or touch screen display. In terms of FIGS. 1 and 2, for example, each of kiosks 100-1a, . . . 100-1n includes a display 110 and an input device 120, with all of kiosks 110-1a, . . . 100-1n being coupled to a processor 150 associated with smart tag reader/writer 170".

Figure 6:
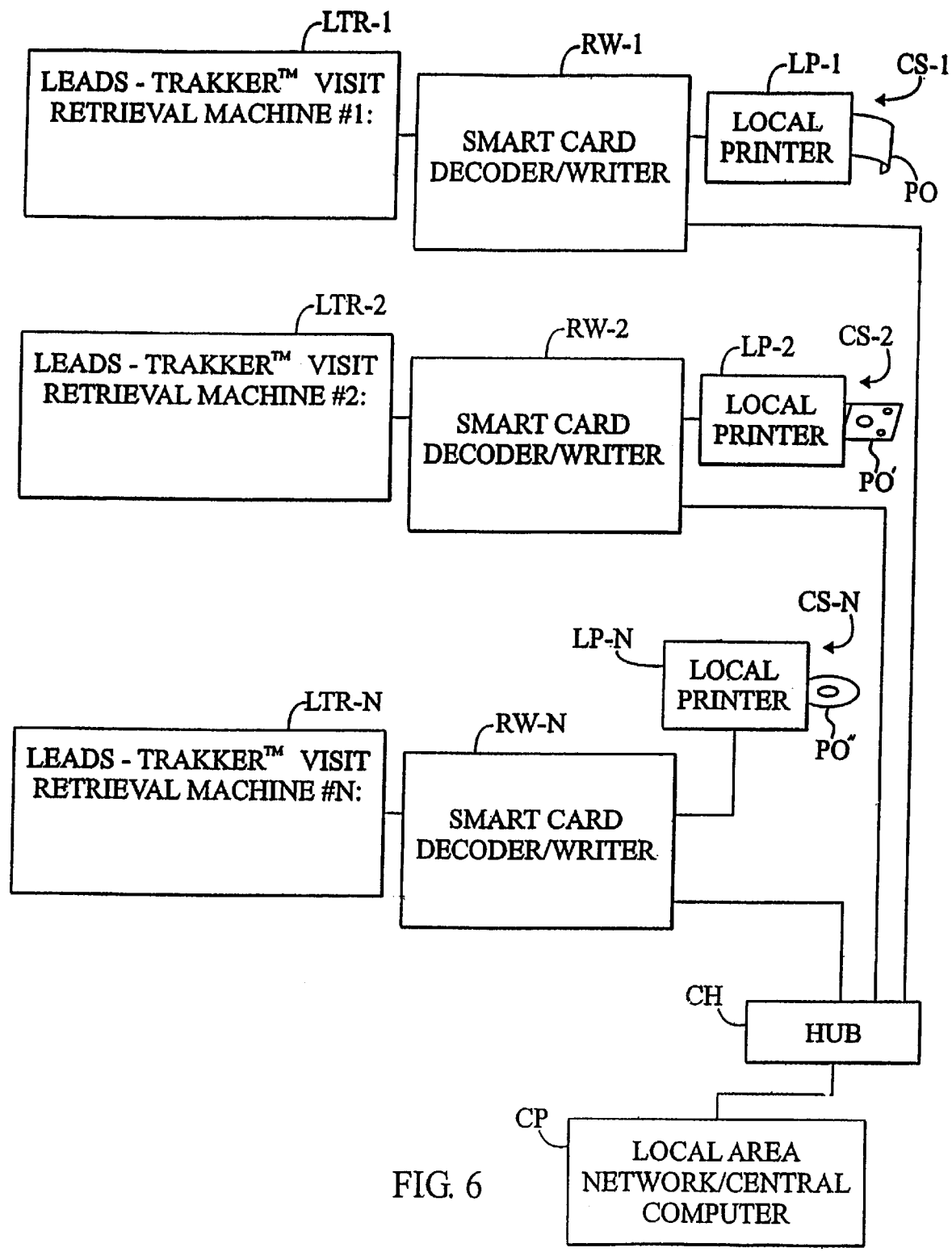
FIG. 6 is a schematic diagram illustrating an example of a check out station of the tracking system in accordance with the invention.

FIG. 6 is a schematic diagram illustrating an example of a check out station CS of the tracking system 20 in accordance with the invention. Check out station CS may include one or more check out modules CS-1, CS-2 through CS-N, where the number of check out modules is selected to accommodate the number of visitors expected to check out at any given time or period of time. Larger exhibitions should employ a greater number of check out modules to reduce the waiting time of visitors waiting to check out to an acceptable time, while smaller exhibitions may employ lesser numbers of check out modules.

Each of check out modules CS-1, . . . CS-N includes a LEADS-TRAKKER™ visit retrieval machine LTR, a smart tag decoder reader/writer RW, and a local printer LP to provide a tangible record of each visitor's visit, as described. In checking out, a visitor presents his smart tag 200 to a reader/writer RW which reads the information stored therein, i.e. which includes at least visitor registration information and may also include station visit information and data item information. Where the visitor may keep the smart tag 200 badge, the reader RW may read the card at a distance, as is preferred at the various exhibit stations or booths, and may also write information to the smart tag. Where the smart tag 200 is to be collected for re-use, reader RW may have a slot into which the smart tag 200 is inserted from which it is read and automatically collected by a collection mechanism included in reader RW.

LEADS-TRAKKER™ visit retrieval machine LTR is a processor or is in communication with a central processor CP for retrieving the names, addresses and other information of the exhibitors of the stations visited by the visitor as indicated by the information read from his smart tag 200. Exhibitor information, such as name and address information, product and service information and the like, is retrieved from a relational database in central processor CP into which it has been entered by the exhibitors, either during or before the exhibition. The record of the visitor's visit, including visitor and visit information read from his smart tag as well as exhibitor information retrieved from the relational database of processor CP is sent to local printer LP for providing a tangible record of the visitor's visit on any desired medium, as described. Examples of such media include a paper document PO as illustrated in association with printer LP-1 of check out station CS-1, a computer floppy disk PO' as illustrated in association with printer LP-2 of check out station CS-2, and/or a computer CD-ROM disk PO" as illustrated in association with printer LP-N of check out station CS-N.

Suitable processors (both local processor LC and central processor 200) include any modem personal computer (PC), such as those having a Pentium®, Celeron®, or similar processor, running a Windows, Unix or other PC operating system. Where a LAN or WAN network is employed, standard PC networking hardware and software may be included in the PCs. Desirably, the processors, as well as the smart tag control units readers/writers, will have redundant memory and information storage, such as by one or more of non-volatile memory, a hard disk drive, a floppy disk drive, a CD-write drive and the like.

Applications relational database programs suitable for recording and manipulating the information include relational data base software such as the Windows-NT-based Microsoft ACCESS data base as well as ORACLE, SYBASE and INFORMIX data base software, and software languages such as Visual Basic, Java, or other language compliant with American National Standards Institute (ANSI) Standard 256. Each data base record will typically include fields some or all of the information mentioned herein.

Available smart tags operate at RF frequencies between hundreds of kilo-Hertz (KHz) and several giga-Hertz (GHz). Typical frequencies for RF smart tags and smart cards (functionally the same but different in form) include 125 KHz, 13.56 MHZ, 915 MHZ and 2.45 GHz. Examples of suitable electronic chips include the "I-CODE" devices available from Philips Electronics of the Netherlands, the "Tag-It" devices available from Texas Instruments of Dallas, Tex., the "Pico-tag" devices available from Inside Technology of France, and the "MIFARE" devices available from Philips Electronics of The Netherlands and from Infineon Electronics which can operate at the frequency of 13.56 MHZ. Other commercial sources of electronic devices for smart tags and smart cards include Microchip Corporation of Phoenix, Ariz., Amtel Corporation of Colorado, Single Chip Systems of San Diego, Calif., and Hitachi of Japan. Such electronic devices typically have writeable memory capacity of at least 128 bytes and preferably have more than 500 bytes of writeable memory.

Suitable smart tag reader/writers include the LEADS-TRAKKER™ available from Avante International Technology, Inc. located in Princeton, N.J., the Fast-Track system available from Escort Memory Systems located in California, the Interrogator Control Module available from Samsys Technologies, Inc. located in California, and the Memor 2000 RFID available from Minec company located in Taby, Sweden, as well as readers/writers available from Intermec Technologies Corporation located in Everett, Washington, Fargo Electronics, Inc. located in Eden Prairie, Minn., or from Atlantek, Inc. located in Wakefield, Rhode Island, or from Avante International Technology located in Princeton, N.J.

Communication with central processor CP is via any suitable communication link or links, which may include one or more local, central or distributed communication hubs CH. Exhibitor information may include catalog and/or sales brochure information and other information that has been entered into processor Cp or for which processor CP has links stored in its relational database, thereby allowing such information to be accessed and retrieved for inclusion in the visitor's individual tangible record.

Therein lies one advantage of the present invention. Each visitor can be provided a tangible record of his visit and all of the data items he requested at the time he leaves the exhibition, whether the tangible record is provided in printed or document form, or is provided in electronic form either directly on a computer readable medium or indirectly via links to Internet web sites stored on a computer readable medium. Moreover, by providing the desired data items on computer readable media, the visitor has the desired information and data items in a conveniently portable form, rather than as a heavy collection of paper documents.

Figure 7A:
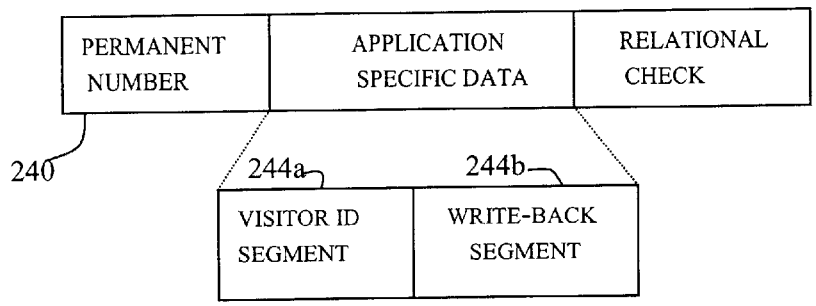
FIGS. 7A, 7B and 7C are schematic representations of memory allocations and relational data base arrangements suitable for use with the invention.

FIG. 7A is a schematic representation of a memory allocation 240 suitable for a smart card 200 for use with the invention. Sections 242, 244, 246 of memory 214 of smart tag 200 are allocated or segmented for the storage of particular information. Typically, an EEPROM memory is utilized.

Manufacturers of the electronic devices or chips utilized in smart tags typically segment the memory thereof into two segments: a first segment 242 into which the manufacturer burns in (i.e. permanently stores in a way that the information cannot thereafter be changed) a unique identifier of the electronic device or chip. Such permanent number 242 may be tens or hundreds of bits in length, as is appropriate for providing a unique identifier. The remainder of the memory capacity 244, 246 is left available for the storing of data therein in use, which data may be modified, written over or otherwise changed in the use of the electronic device.

Smart tags ST, ST' are typically utilized for tagging and electronically identifying objects by reading information stored in the electronic memory of the smart tag using contact-less radio-frequency (RF) transmissions. For the present smart tagging system and method, an electronic integrated circuit in the form of a semiconductor chip is connected to an antenna on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

While it is satisfactory to utilize only the stored permanent number identifier 242 to identify the smart tag containing the electronic device, it is preferred that the permanent number 242 be stored in a relational database in a processor and be linked to other identifying or use information for use in identifying the object or article to which the smart tag is attached or with which it is associated. Such processor is in communication with the smart tag readers that read information from memory 240 of the smart tags.

One potential problem associated with such smart tags occurs where the information desire to be stored therein is simply coded and written into the writeable memory 244, 246. In that case, any change to the information stored therein is undetectable. Typical sources of erroneous or corrupted or erased data include electromagnetic interference, whether accidental or intentional, as well as any intentional or unintentional attempt to modify the stored information, whether authorized or unauthorized, such as by a thief or counterfeiter. Having other than the correct data stored in the memory of the smart tag can lead to misdirection, loss or damage to property and/or injury to person, none of which is desirable or acceptable.

To reduce the likelihood of undetected erroneous stored information, the remaining memory 244, 246 available to the smart tag user is further segmented into two segments. The first segment 244, which is typically of greater memory capacity, is allocated for the storage of application specific data, such as the visitor identification information, 244a, and for information 244b that is written back to the smart tag memory by the smart tag reader/writer at the various stations, such as booths visited, data items requested and the like. The second and smaller memory segment 246 is allocated for storing a relational check number or code that is a calculated or coded value representative of at least the value of the stored application specific data, and preferably representative of the value of both the permanent number and the application specific data. Herein, the relational check number or code is usually referred to simply as the relational check number to include numbers and/or codes.

Where the smart tag includes processing capability, the processor can be programmed to calculate the relational check number upon each time data is written to its memory, preferably upon command to do so. Alternatively or additionally, each reader/writer or an associated processor or central processor can calculate the relational check number. Because the electronic device utilized in a smart tag has substantial memory capacity, the relational check number can include many bits and so can be constructed to permit error correction as well as error detection.

The foregoing arrangement permits detection of errors and/or changes to the application specific data at any time by reading the card and recalculating the relational check number which is then compared to the relational check number read from the smart tag. If the read and calculated relational check numbers match, then there is a high degree of certainty that the application specific data has not been changed and does not include errors.

It is noted that while the permanent number, the application specific data and the relational check number or code are referred to as "numbers," each may include numerical, alphabetic, alpha-numeric and other characters and symbols, conventional or arbitrary, as may be desired. The relational check number or code is representative of the information stored in the memory in accordance with a predetermined formula or algorithm or other scheme, either on a character by character basis or on the basis of one or more combinations of the characters or values stored in the memory. Suitable formula and algorithms include, for example, parity checks or other parity representations, sum checks, field relationship checks or any other predetermined relationship between the stored permanent number and application specific data values and the relational check number.

Thus, any change to the stored information, including a change that changes the stored value of the relational check number or code, will be detectable and an indication that the stored data contains one or more errors or changes. Typically, the particular formula or algorithm that generates the relational check number is not known to third parties and is not derivable from the data stored in the smart tag memory, and so the relational check number provides a degree of security for the information stored in the smart tags.

The formula or other algorithm or other encoder for generating the relational check code or number may be provided in protected firmware, in software or in a combination of firmware and software, to provide a higher level of security against deciphering or unauthorized coding. For additional security, each encoder may also include a unique identifier that must be paired with coding software having the same unique identifier for enabling proper functioning. The unique encoder identifier may also be included in or as part of the application specific data.

Figure 7B:
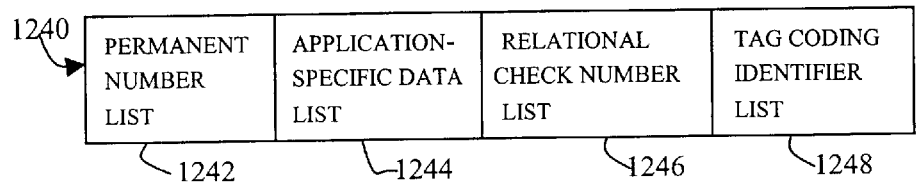
Figure 7C:
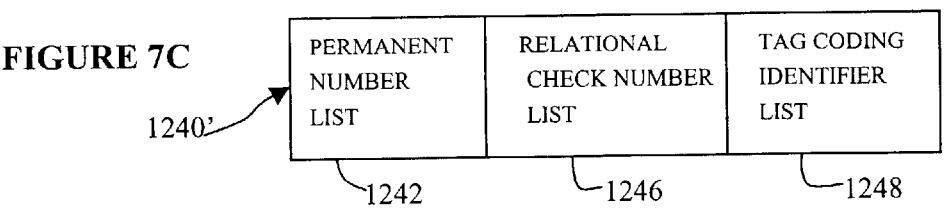

FIGS. 7B and 7C are schematic representations of memory allocations of a relational database of a processor suitable for use with the invention. Database 1240 represents an aggregation of records stored in relational database computer software running on a processor. Compiling records of data written to smart tags in a relational database is particularly advantageous where the data is written to the smart tag and where it is important to be able to retrieve such data should the smart tag be misplaced, lost or stolen, or if the information stored therein is changed or corrupted or lost for any reason.

In a complete database, database 1240 illustrated by FIG. 7A stores a record each time data is written to any smart tag used with the tracking system. Database 1240 includes, for example, a number of data fields comprising a list 1242 of the permanent numbers of the smart tags, a list 1244 of the application specific data of each writing of application specific data to each smart tag, a list 1246 of the relational check number written to each smart tag with each writing of application specific data thereto, and a list 1248 of tag coding identifiers such as the date, time, reader/writer identification for each writing of application specific data to each smart tag. Lists 1242, 1244, 1246, 1248 are comprised of aggregations of records corresponding to each writing of information to each smart tag, and may be provided from one or both of the smart tag and the reader/writer utilized for each writing of information.

In a simplified database, database 1240' includes, for example, lists 1242, 1246 and 1248. This database arrangement may be advantageous where the database is stored in a local processor and/or a smart tag reader/writer where available memory capacity may be more limited than in another processor. In either a complete or simplified data base, information relating to each writing of information to each smart tag is communicated to a processor in real time or delayed, and may be periodic or aperiodic. Information may be communicated by any of the means described as well as by manual communication, e.g., by transporting the smart tag reader/writer and/or local processor and/or computer media containing the information stored in such smart tag reader/writer and/or local processor to another processor.

Suitable relational database software include ACCESS database software which runs on conventional PC processors with standard operating systems, such as Windows-NT, both available from Microsoft Corporation of Redmond, Washington, as well as the ORACLE, SYBASE and INFORM IX database software. Preferably the database software is "Inte met-ready" in that it includes features facilitating connection to and communication of information via the Internet.

Each database record will typically include fields for some or all of the following application specific data or information in addition to the permanent number:

Visitor information including but not limited to visitor identification, name, address, business and/or personal affiliation, member number, registration number and/or other identifying number, and the like.

Visit information including but not limited to booth/station identification, contact personnel identification, entry and exit time data (arriving and leaving), date, keypad/keyboard entered data, data item/information requests, interest in products/services, follow-up information, smart tag information, and the like.

Relational check number representative of any or all of the foregoing application specific data and/or the permanent number of the smart tag.

Where the information written to each smart tag is all communicated to and stored in a central data base and where all subsequent action to be taken will be taken based upon the information stored in the central database, then the use of a relational check number to verify the information stored in the smart tag and/or detect errors in and changes thereto is of much less importance.

In any case, the central data base can be utilized to provide particular information, general information, status information, statistical information, and other information on an on-line basis that is at least as current as the entry of record information into the database. Where every writing of information to a smart tag is also replicated in a record stored in the relational data base, the relational database contains and can provide a detailed history of the utilization of the smart tag, e.g., the path of the visitor's visit to the exhibition and the date and time of each visit to each booth as well as information requested or entered at each such visit.

Figure 8A:
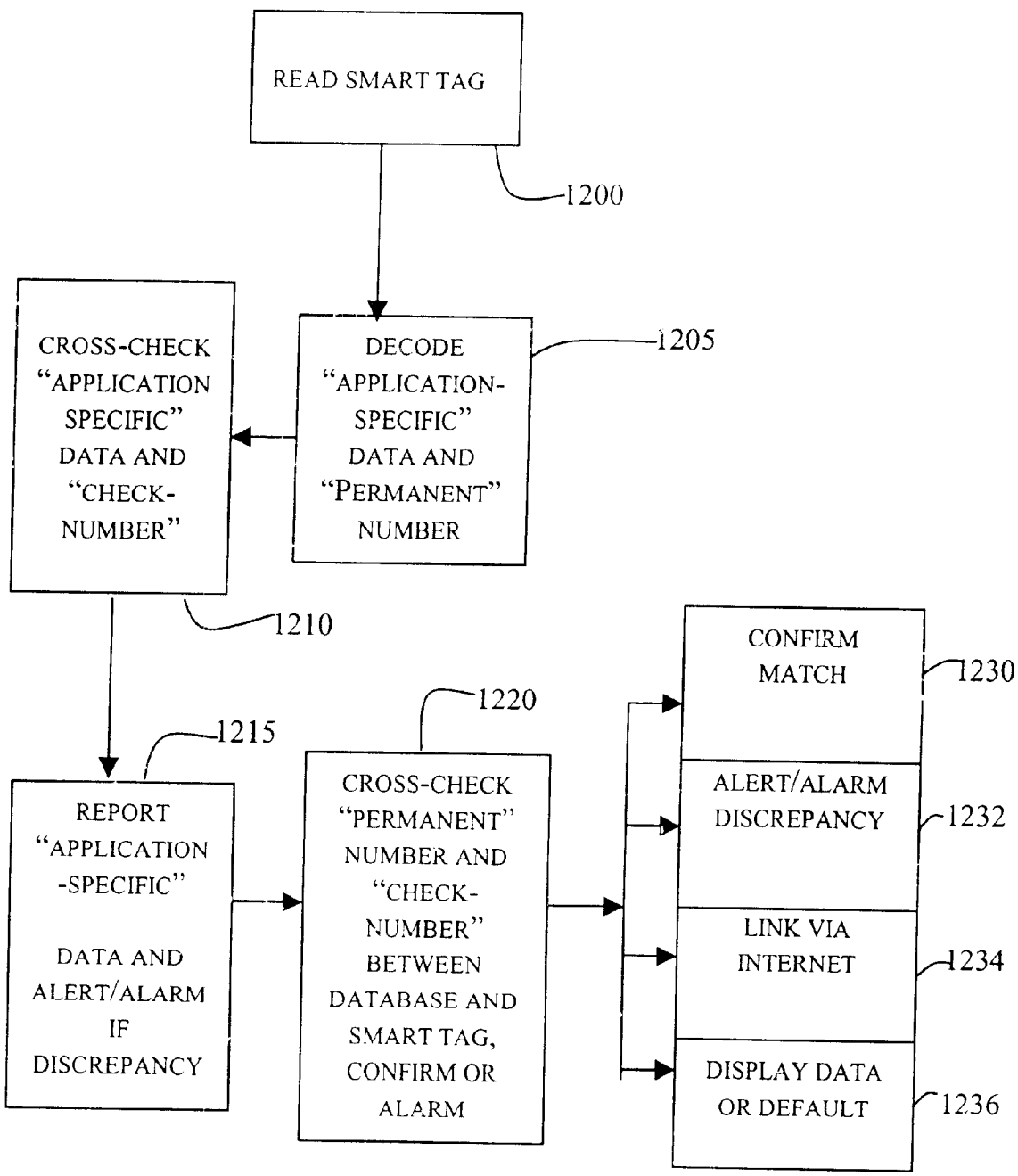
FIGS. 8A and 8B are flow chart schematic diagrams of examples of utilization of the memory allocations and relational data base arrangements of FIGS. 7A–7C according to the invention.

FIG. 8A is a flow chart schematic diagram of an example of a utilization of the memory allocations 242, 244, 246, and of memory allocations and relational data base structures 1242, 1244, 1246, 1248 of FIGS. 7A–7C according to the invention. Information from the smart tag is read 1200, such information including, for example, a permanent number related to the particular smart tag, application specific data relating to the visitor and visits at an exhibition, and a check number representative of at least the application specific data and preferably the application specific data and the permanent number. Application specific data read from the smart tag is decoded 1205 and the permanent number read from the smart tag is stored.

A cross check 1210 is made between the application specific data and the permanent number read from the smart tag. Cross check 1210 includes calculating from the application specific data and the permanent number the value of the check number and comparing that calculated value to the value of the check number read from the smart tag. If the two check numbers correlate, then there is a high degree of confidence that the application specific data does not contain errors and has not been altered. It is noted that cross check 1210 is performed at least initially using only the information read from the smart tag and so does not necessarily require a central processor or database. If there is a non-correlation or other discrepancy, such non-correlation or discrepancy produces an alarm 1215 and further correlation steps may be taken.

Results of the reading of smart tags and of the correlation of the check numbers thereof are reported 1215 in any convenient form. Such reporting may be by aggregation of records in a data base for current or delayed review, by displaying the results or summaries of results or statistics related to results on a human-perceivable display, or by initiating an alarm 1215 of lack of correlation of check numbers. Such alarm may take the form of a print out, a paper document, a visual display, a warning screen, an audible signal, a signal to a control or monitoring station or to a pager or cell phone, or any other convenient form of alarm or signal.

A further cross check 1220 may be made to check at least the permanent number and relational check number stored in the database to the permanent number and relational check number read from the smart tag. Because the permanent number of a smart tag cannot be changed, cross check 1220 includes comparing the relational check number read from a particular smart tag having a given permanent number with the relational check number stored in the relational database for the most-recent record corresponding to that given permanent number. Correspondence or lack of correspondence of the respective relational check numbers from cross check 1220 is utilized to confirm such correspondence or lack thereof by human-perceivable display or alarm, as described above.

In particular, correspondence in cross check 1220 initiates confirming a match 1230, e.g., by any human-perceivable display, report or alarm, as described above. Lack of correspondence in cross check 1220 is a discrepancy that initiates giving an alarm 1232, e.g., by any human-perceivable display, report or alarm, as described above.

Initiating a human-perceivable display or alarm, or communicating information to or from another location can include linking 1234 the processor performing any of cross checks 1210 and 1230 and/or producing a report or alarm 1215, 1230, 1232, to a remote processor, display or alarm via the Internet. Such linking via the Internet 1232 may include accessing a remote relational database, which may be an open database to which information can be added, deleted or changed or which may be a closed database not allowing information to be added, deleted or changed via the Internet link. Access may be controlled by access codes, passwords and the like as desired, and information communicated via the Internet may be encrypted, to provide the desired degree of security.

Further, correlation or lack of correlation or any other difference between the information read from a smart tag and the related information stored in the relational database initiates displaying 1236 data from any one or more of the smart tag and a local or central relational data base, or if such data is limited or missing, displaying 1236 a default indication, e.g., whatever information is stored in the database. Displaying 1236 may include displaying information from the smart tag and the relational data base or may be limited, e.g., to displaying the differences and/or discrepancies of that information, and may be immediate or delayed. Displaying 1236 may be for each cross check 1210, 1220, or may be for any number of cross checks 1210, 1220.

The display of the result or status of any step and/or of the information to which attention is to be drawn may be included in a display of information, e.g., such as by highlighting or coloring the portion of the displayed information to which attention is to be drawn, or by separately displaying the information to which attention is to be drawn. Where information desirable to be displayed is available in the relational data base, such information is retrieved and displayed automatically, either locally, remotely or via the Internet, as appropriate. If such information is not so available, a warning or instruction to an operator is provided to instruct the operator to either retrieve the information or to segregate or mark the affected smart tag for special treatment or handling, e.g., such as alerting an attendant at the check out station when someone uses that smart tag to check out.

It is noted that the foregoing arrangements and method also can enable the detection of changing or tampering with the information stored in the smart card for the unlikely case where the changing or tampering is done with knowledge of the calculation of the relational check number. In such case, the relational check number is correctly related to the application specific data and/or the permanent number and so the simple cross checking 1210 will not detect the changing or tampering. Because the information written to each smart tag is also stored in the relational database correlated to the smart tag unchangeable permanent number, comparison of the changed or tampered-with information read from a smart card is detectable by cross checking 1220 that read information against the information stored in the relational database.

Where desired, the relational database may be accessed and made available by any convenient means, e.g., by providing same on floppy disk or CD-ROM, optical CD and the like that is easily sent by mail, express and the like, or by making same available via communication means such as wire, cable, optical fiber, LAN, WAN, optical or radio frequency transmission, the Internet and the like.

Figure 8B:
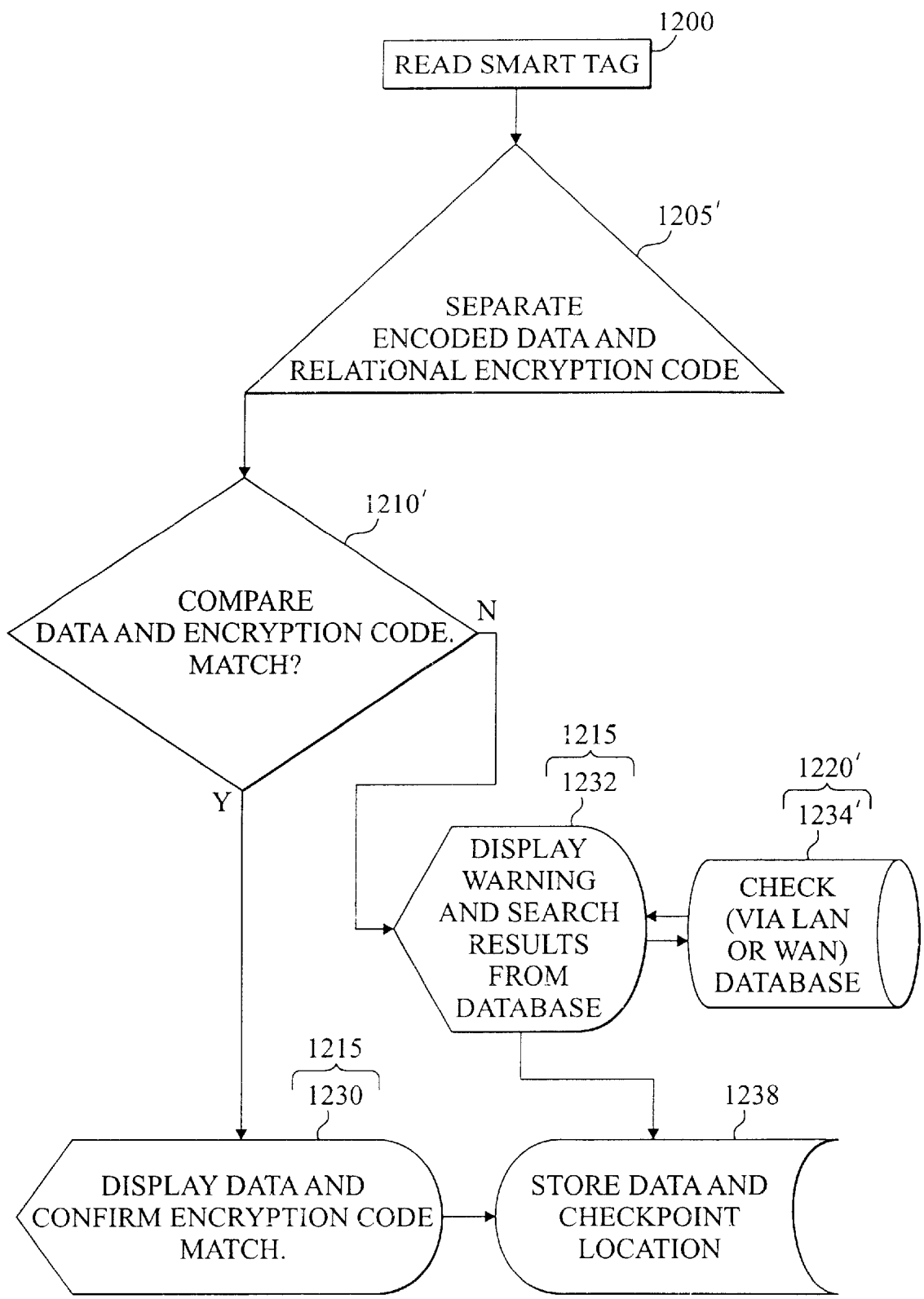

FIG. 8B is a flow chart schematic diagram of another example of a utilization of the memory allocations 242, 244, 246, and of memory allocations and relational data base structures 1242, 1244, 1246, 1248 of FIGS. 7A–7C according to the invention. It is noted that the steps of FIG. 8B include steps as described above in relation to FIG. 8A, but arranged for a more direct illustration of certain steps. Information from the smart tag is read 1200, such information including, for example, the permanent number related to the particular smart tag, application specific data, and a relational check number (also referred to as a "relational encryption code") representative of at least the application specific data and preferably the application specific data and the permanent number.

The encoded application specific data and relational check number read from the smart tag are decoded and separated 1205' and are compared 1210' to determine whether the relational encryption or check code or number read from the smart tag corresponds to or matches the relational encryption or check code or number recalculated by the processor from the application specific data and the permanent number read from the smart tag. I.e. match 1210' is a cross check that includes calculating from the application specific data and the permanent number the value of the relational check number and comparing that calculated value to the value of the check number read from the smart tag.

If the two check numbers correlate (i.e. match, path "Y"), then there is a high degree of confidence that the application specific data does not contain errors and has not been altered, and the application specific data is displayed 1215/1230 along with confirmation that the relational check number correlates.

If there is a non-correlation (i.e. non-match, path "N") or other discrepancy, such non-correlation or discrepancy produces the display of a warning or alarm 1215/1232 and initiates further correlation steps. Such further steps include retrieving 1220'/1234' from a relational database records stored therein corresponding the particular smart tag related, for example, by its permanent number, and displaying or posting 1215/1232 such retrieved stored records. Access to the relational database, if not direct in the processor, is by communication 1220'/1234' with a processor via communication means, typically a LAN or WAN, or via the Internet.

Whether there is correlation or non-correlation of the relational check number, a record is stored 1238 in the relational data base including the information read from the smart tag in step 1200, whether or not the read data correlated or not in step 1210', and the identity of the station or check point at which such data was read.

Figure 9:
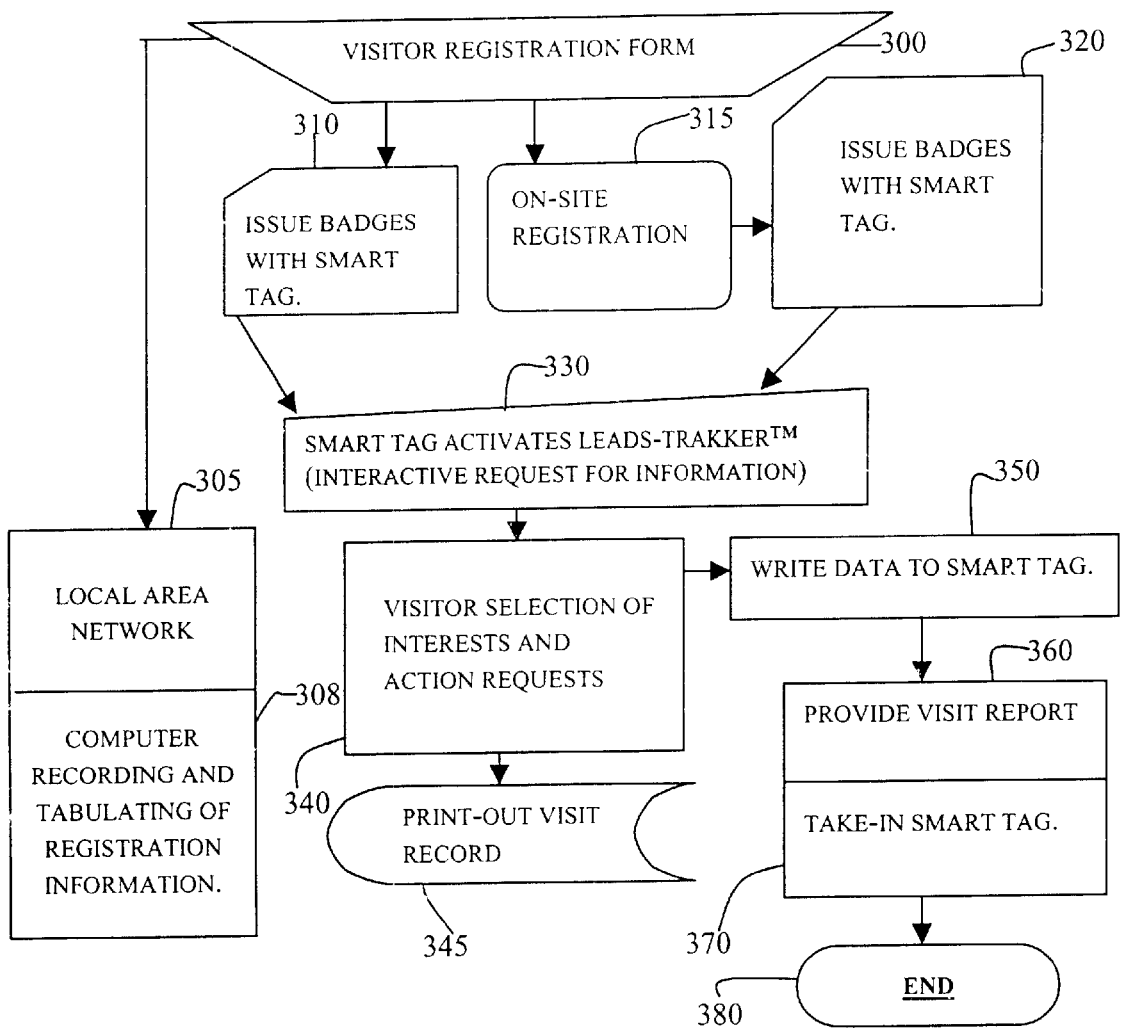
FIG. 9 is a flow chart schematic diagram of an example of the method of a tracking system according to the invention.

FIG. 9 is a flow chart schematic diagram of an example of the method and operation of a tracking system according to the invention. Registration 300 of visitors typically begins in conventional manner by the visitor submitting a registration form containing necessary and/or desired information pertaining to the visitor, such as name, address, business or personal affiliation, telephone and facsimile numbers, email address and the like. Registration may also include registering for special events or sessions, such as luncheons, dinners, receptions, performances, tours, and the like. Registration 300 may be accomplished in advance and/or remotely of the exhibition or may be "walk-in" or "on site" registration 315 at the exhibition. Advance registration may be by mail, e-mail, communication network, telephone, the Internet, or any other medium, and may or may not involve the payment of fees or admissions, the use of "free passes" or complimentary admissions and the like. "Badges" including a smart tag are issued 310 to preregistered visitors and are issued 320 to on-site visitors. Smart tag badges include an electronic device or chip having a memory and a processor for transmitting and receiving information wirelessly via an antenna. Preferably, the smart tag badge also includes traditional badge attributes in human readable form, such as the visitor's name, the exhibition name or symbol, company affiliation, and the like. Such human readable information may be printed directly on the smart tag or on a paper or plastic label that is affixed thereto. The smart tag badge may be a smart card (i.e. the same smart tag chip and antenna in a plastic card similar to a credit card) where it is desired that visitors retain same as for post-exhibition advertising and/or a souvenir. Issuing 310, 320 an identification badge may be by mail or other means or may be in person either on site or off site.

Issuing 310, 320 a smart tag badge preferably includes associating the visitor with the permanent number of the smart tag electronic chip as well as with a registration number, a member number or other identifier stored in the smart tag memory. Issuing 310, 320 further includes entering visitor identification information and/or exhibition information into the memory of the smart tag, and recording (storing) 305 some or all of the foregoing information in a relational database of a processor.

Storing 305 of visitor and registration information in a processor or computer relational database for recording and tabulating visitors and their registration information may be via a local or wide area network, the Internet or any other communication medium. Print outs or other reports of visitor information from the relational data base may be provided to exhibitors and/or the organizer or sponsor of the exhibition.

The visitor then attends the exhibition, visiting whichever booths or stations he desires. At each booth or station equipped with a smart tag reading LEAD-STRAKKER™ electronic gate, the smart tag is activated by and/or activates 330 the LEADS-TRAKKER™ electronic gate for the reading of information stored in the smart tag memory. Activation 330 includes one or more of reading and optionally storing the information from the smart tag memory, displaying or announcing a welcome or greeting which may be personalized by visitor information read from the smart tag, and optionally writing 350 information, such as exhibitor and visit information, to the smart tag memory.

Writing 350 information to the smart tag memory may include writing exhibitor information relating to the identity of the station and its exhibitor, and visit information such as time and date of visit, expressions of interest, requests for data items, i.e. any information selected or entered 340 or otherwise provided by the visitor or the exhibitor such as via a keyboard, touch screen or other input device. Writing 350 also includes storing the information, preferably in a relational database, either in a local processor and/or by communicating the information to a central processor. Such information is retrievable 360 as a printed report, a floppy or CD-ROM disk or other convenient form, or by electronic access, at a convenient time. Where the information is stored in a relational data base, only the exhibitor identification number and visit information need be stored in the smart tag.

Optionally, a local printer may print out or otherwise provide 345 a record or report of the visit for the visitor, the exhibitor or both. Print outs may be provided by a simple and inexpensive thermal, dot-matrix or ink-jet printer. If provided at the time of the visit, such report may be used to verify that the desired information has been obtained, for more efficient follow up, and may, where the exhibitor has entered suitable files into the processor of the LEADS-TRAKKER™ electronic gate, include data items requested by the visitor. Advantageously, such data items are those of interest to the visitor and are produced as needed and in the quantities necessary to meet visitor requests, and the exhibitor need only carry a floppy disk or CD-ROM disk to its booth; there is no need to transport cartons of documents to the booth.

Providing 360 a visit report principally pertains to a visitor checking out of the exhibition, e.g., at the end of a visit, at the end of a day, or at the end of the exhibition. In response to the visitor smart tag being detected at a check out station which includes a smart tag reader, information stored in a memory, which may include some or all of visitor information, visit information and exhibitor information, is retrieved and provided in suitable format, such a printed report, a floppy or CD-ROM disk or other convenient form. Such information is retrieved from the relational database of a processor where visitor information, registration information, visit information and exhibitor information are communicated thereto and stored therein during the exhibition and is retrieved from the memory of the visitor's smart tag badge where such information is written to the memory of the smart tag as the visitor visits the various booths and stations of the exhibition and enters information via a keyboard, touch screen or other data input device. If visit information is stored in the visitor smart tag, such information when read at check out is preferably stored in a relational database of a processor at the check out station or a central processor.

Providing 360 a report also pertains to providing reports to exhibitors and to exhibition organizers and sponsors in similar manner, although the particular information provided is customized according to the needs and interests of the person for whom the report is produced. An exhibitor can be provided records of visitors to its booth or station and of the information provided and/or requested and the like. The organizer/sponsor can be provided lists of visitors and exhibitors, information on the attendance vs. time of day and/or by exhibitor, which is useful for analysis, evaluation and planning.

The foregoing two paragraphs illustrate a powerful advantage of the present invention in storing visitor information, exhibitor information and/or visit information in a relational database from which the data can be retrieved according to criteria customized to meet the needs and interests of involved parties of various types, as well as for analysis and evaluation and planning, and reports can be similarly customized both as to content, form and format. Reports provided in electronic form, such as floppy or CD-ROM disk or via the Internet, may be in widely usable formats such as ASCII format, word processor format (e.g., WordPerfect or MS Word), database or spreadsheet format (e.g., Excel), in document format (e.g., Adobe Acrobat .pdf) and/or in any other convenient format.

Moreover, not all information need be stored in every location because an identification or tracking number relates all the information stored. For example, the permanent number of a smart tag points to the visitor information and his registration information, as well as to his visit information and requests for data items. Thus, the electronic gate need only store the visitor identification (permanent) numbers of the visitors thereto, because all the related data pertaining to those visitors can later be accessed in the relational database records. Similarly, the visitor smart tag need only store exhibitor identification numbers of the booths and stations visited because all of the information pertaining to each of the visitors visits to booths is retrieved using the exhibitor identification number to access the visit records stored in the relational database for that number and that visitor. As a result, the required memory capacity of the electronic gates and of the smart tags is substantially reduced from what would be required absent the relational database.

It is noted that smart tag reading LEADS-TRAKKER™ electronic gates, registration stations and check out stations may be owned, leased or rented by the exhibition organizer/sponsor and/or exhibitors, or by a facility in which an exhibition is held, as may be most advantageous for the parties involved. In particular, renting or leasing the apparatus has the advantage that all stations and booths at an exhibition will be compatible and will operated together in the manner described, and also avoids the exhibitors having to transport such apparatus to and from the exhibition. In addition, an exhibitor can easily and economically tailor the number and types of electronic gate(s) utilized to suit each exhibition, the size of its station thereat and the anticipated number of visitors.

Figure 10:
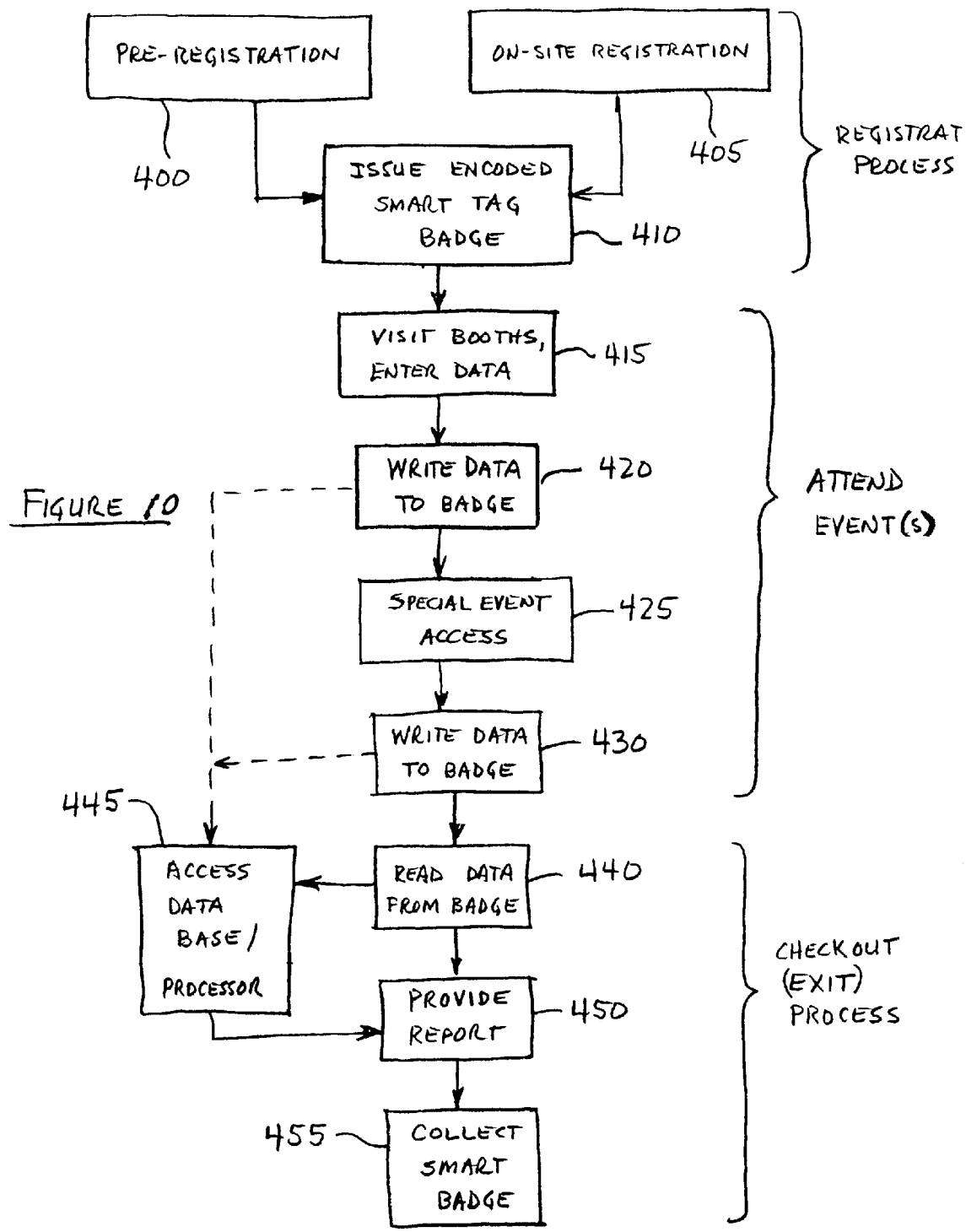
FIGS. 10, 11 and 12 are schematic flow chart diagrams illustrating an example of the method of the present invention.

FIG. 10 is a schematic flow chart diagram illustrating an example of the method and operation of the present invention. A registration process includes either or both of pre-registration 400 and on-site registration 405 of a visitor leading to issuing 410 an encoded smart tag badge to the visitor, all as described above, for example, in relation to FIG. 9. The coded smart tag has information stored therein from the visitor registration, such as name, address, telephone and facsimile numbers, e-mail and/or web site address, title, affiliation, and any other entered data such as the visitor's interests. Where the exhibition includes special events requiring specific or additional registration or payment, indications of access permissions to such special events may also be coded to and stored in the smart tag.

Attending an exhibition typically includes visiting booths 415 and entering data, such as interests and data item requests, via a keyboard or touch screen thereat. Information from the visit to the booth is electrically written back 420 to the visitor's smart tag badge by a reader/writer, and the smart tag may also be electrically read to retrieve information stored therein for display, greeting, annunciation or later use. Writing information 420 to the smart tag may be associated with communicating and storing information in a relational database 445 (as represented by the dashed line to box 445), in which case complete information may be communicated to and stored in the database and only the exhibitor's number or booth number need be stored in the smart tag because the information stored in the database can be accessed using the exhibitor number stored in the visitor's smart tag.

Attending event(s) at an exhibition typically includes gaining access 425 to the place where each event is conducted. Access is granted or denied by electrically reading information from the visitor's smart tag badge and determining whether that information includes an indication permitting access to the particular event. Information that access to the event has been granted is written back 430 to the visitor's smart tag badge, thereby disabling it from use to again gain access to that event. The smart tag may also be electrically read to retrieve information stored therein for display, greeting, annunciation or later use. Writing event information 430 to the smart tag may be associated with communicating and storing information in a relational database 445 (as represented by the dashed line to box 445), in which case complete information may be communicated to and stored in the database and only the event number or other identification need be stored in the smart tag because the information stored in the database can be accessed using the event number stored in the visitor's smart tag.

A check out or exit process marks the end of the visitor's attendance at the exhibition. Checking out includes electrically reading 440 the data and information stored in the visitor's smart tag badge and communicating such information to access the relational database in the processor and store the information therein. Information from the relational database is utilized to prepare and provide 450 a report to the visitor in whatever paper or electronic format is appropriate, as described above. The report may include registration information, visit information, and event information, as well as lists of or copies of data items requested, all as described.

Where it is desired to collect 455 the smart tag badge, the check out station tag reader typically includes a mechanism to automatically take in the smart tag.

Figure 11:
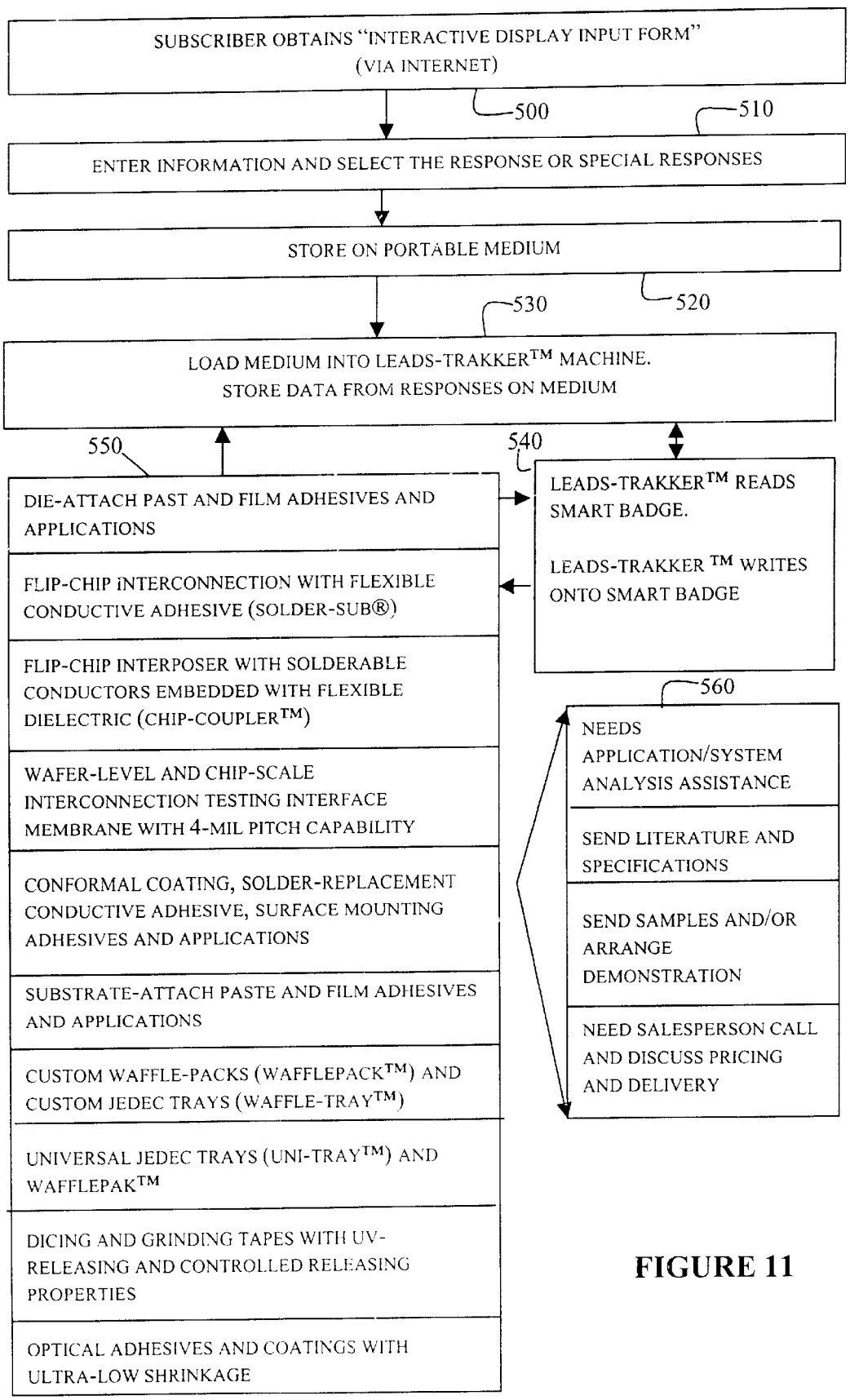

FIG. 11 is a schematic flow chart diagram illustrating an example of the method and operation of the present invention, in particular, as relating to registration of an exhibitor. An exhibitor obtains 500 an input form that he can complete to register as an exhibitor at an exhibition and/or enter information that can later be accessed at the exhibition. Preferably, access and entry of information is electronic, whether by receipt of an electronic form on a tangible medium such as a floppy disk or CD-ROM or via the Internet, and is interactive in that the exhibitor is prompted to enter data or otherwise respond.

The exhibitor enters 510 exhibitor information that may include but is not limited to identifying information such as name, address, telephone, facsimile, web site, e-mail and the like, as well as data items which may be summary or complete in content. With Internet or writeable CD-ROM access, for example, complete product literature, data sheets, catalogs and the like may be entered for retrieval at the exhibition.

Entering 510 information typically includes entering summary information or listings of products or services that will be the subject of visitor inquiry as well as answers to such inquiries. Exhibitor information 550 is an example of the kind of summary product information that a typical exhibitor such as AI Technology, Inc. of Princeton, N.J., might enter.

Preferably, exhibitor information is loaded or stored 520 on a portable medium that can easily be transported to the exhibition, such as a floppy disk or a CD-ROM. Suitable file formats may include word processor formats and spread sheet or database formats or other document formats (e.g., WordPerfect, MS Word, Excel, Access, Adobe .pdf, etc.). At the exhibition, an exhibitor loads 520 the portable medium into the processor of an electronic gate at its booth or station, and the information therein is then stored and available electronically through the processor thereof, for reproduction as needed and or for the writing of at least identifying information to the smart tags of visitors that visit that exhibitors booth.

Reading 540 a visitor smart tag badge when a visitor comes to the exhibitor's booth and brings his smart tag sufficiently close to the LEADS-TRAKKER™ machine electronic gate initiates greeting the visitor by name and enabling the visitor to review the exhibitor information stored in the processor of the LEAD-STRAKKER™ machine, e.g., using a touch screen. An initial screen display may include a welcome and questions soliciting information from the visitor. The initial or subsequent screens may provide 550 lists of products and/or services of the exhibitor in a form that the visitor by touching the appropriate portion of the touch screen can access additional information 560 via a branching/tree inquiry structure to reach the information desired. The visitor will also be able to click on various "buttons" on the displayed information screens to initiate requests for information and/or data items, either immediately or for future delivery. The visitor experience interacting with the LEADS-TRAKKER™ machine at each booth will be much like visiting a web-site with the addition that live personnel will be present to respond and samples of product and merchandise may be available for inspection and/or sale.

Figure 12:
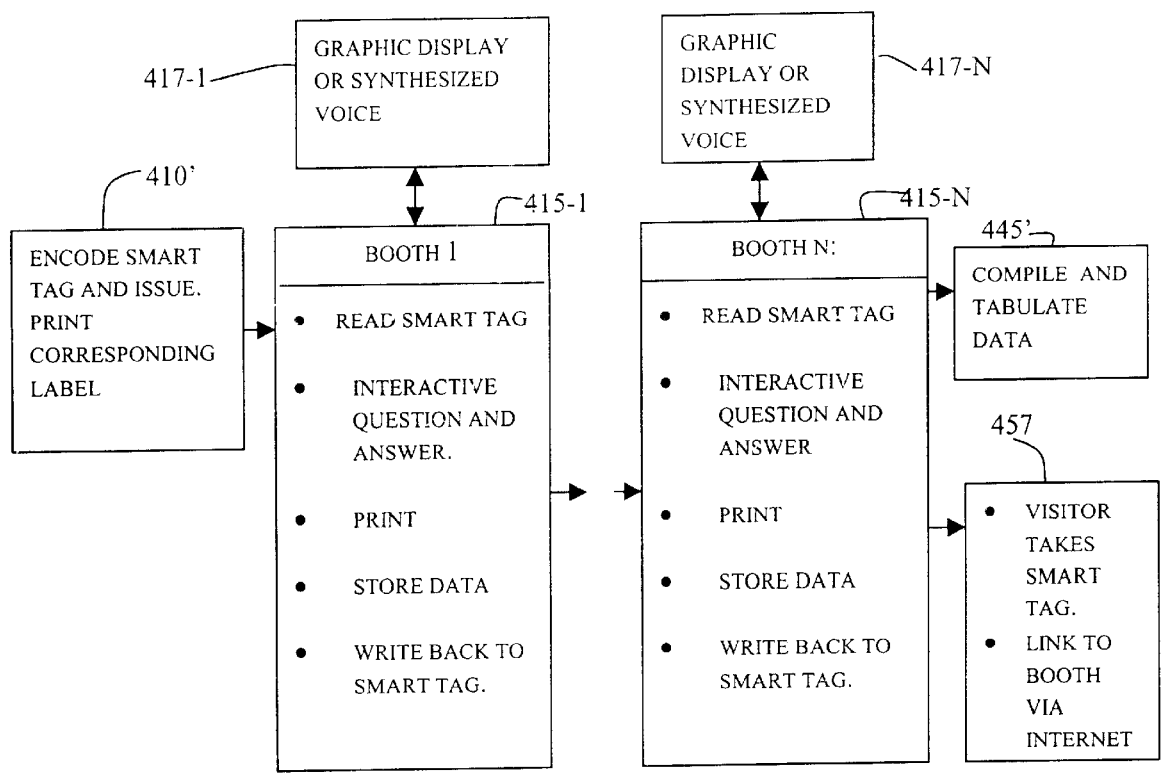

FIG. 12 is a schematic flow chart diagram illustrating an example of the method and operation of the present invention illustrating, in particular, utilization of the smart tag in performing a typical method, such as the method of FIG. 10. Encoding step 410' the smart tag with visitor and registration information comprises storing such information therein and printing a corresponding visitor label, either directly on the smart tag or on a label to be affixed or associated with the smart tag, and issuing the smart tag to the visitor.

The visitor takes the smart tag and begins to visit booths at the exhibition. At booth 1, step 415-1 comprises reading the smart tag, starting an optional interactive question/answer interchange with the visitor, printing information for the visitor, storing information relating to the visit, and writing visit information back to the visitor's smart tag. In response to read visitor information, a welcome or greeting is provided 417-1, such as by visual display or announcement such as by synthesized voice. Visit information such as exhibitor identity, booth identity, time and date of visit, data items requested and the like are stored. For example, visit information may be stored in a memory associated with either an electronic gate at the booth, a local processor or a central processor, or may be stored in the visitor's smart tag.

At booth 2 through booth N, i.e. all booths subsequently visited, the visitor's badge is similarly read 415-2–415-N and a greeting is provided 417-1–417-N in like manner to that of booth 1. Thereafter, information is processed such as by compilation and tabulation 445' either by being read from the visitors' smart tag badges or by communication from the memory in which it was stored to the processor. Processing 445' may pertain to any or all of individual visitors, all or a group of visitors, an exhibitor, all or a group of visitors, a given booth, all or a group of booths, a given day or other time period, or any other arrangement or organization of the information collected by the smart tags and/or the smart tag tracking system.

While the smart tag badges may be collected from visitors as they exit the exhibition, visitors may retain 457 their smart tags into which is encoded at the various booths or at check out with the web site addresses for the exhibitors so that the visitors can later link to those web sites for inquiry, curiosity, or obtaining further information. Alternatively, the visitor can exchange his smart tag badge and receive 457 a floppy disk onto which is stored the aforementioned information as well as any additional information desired, possibly including data items requested. In either case, reading at least the visitor, visit and exhibitor information stored in the visitor's smart tag provides the pointers to records in a relational database from which is retrieved the information that is stored on the badge or floppy disk that is taken 457 by the visitor.

While various antenna array arrangements may be utilized with the present invention, suitable antenna arrays are described in detail in Applicant's co-pending U.S. patent application Ser. No. 09/854,722 entitled "Antenna Array for Smart RFID Tags" filed on May 14, 2001, which is hereby incorporated herein in its entirety.

While the present invention has been described in terms of the foregoing exemplary embodiments, variations within the scope and spirit of the present invention as defined by the claims following will be apparent to those skilled in the art. For example, many different combinations of antenna arrays, control units, smart tag reader/writers, communication devices and processors may be employed in making and using the system and in practicing the method of the present invention.

While only one processor (computer) is necessary to the present invention, it is often convenient to employ a plural processors which are linked, as by a network, for example, to a central processor. Typically, each local processor is associated with one or more stations for monitoring and/or communicating information with such station(s), and is linked with the central processor for communicating monitoring information therewith. Thus, stations may operate independently, under the control of a local computer, under control of a central computer, or some combination thereof.

Any convenient communication protocol, such as the RS-485 or RS-232, may be employed. The selection of wired and/or wireless communication among various stations of a tracking system typically will depend on the location and proximity of the various stations and the relative ease of providing wire, cable or optical fiber as compared to wireless radio frequency or optical communication.

Communication among stations and/or processors may occur periodically, but promptly (e.g., within seconds) relative to the speed at which new visit information, for example, is recorded, and the timeliness of tracking and monitoring desired. Periodic communication may be beneficial for wireless communication to reduce frequency spectrum and bandwidth requirements in a confined exhibition space.

Exhibitor smart tags that are different from smart tags issued to visitors may be provided so that exhibitors at a booth can monitor information relating to that booth and visits thereto. Exhibitor smart tags may be different in form from visitor smart tags but need not be. Exhibitor smart tags are different in function in that they are at least differently coded so that smart tag electronic gates at a booth, as well as at a check out station differentiate them from visitor smart tags, for example, to enable access to certain stored information and/or reports intended for the particular or all exhibitors.

Information stored in the relational data base of processor, whether central or local, as well as in memory associated with an electronic gate, may be stored on plural storage media for redundancy. Typically, the relational data base is maintained on a computer hard drive, and may be duplicated on another hard drive of the same or a different processor, or on a different media such as non-volatile memory cards or modules, magnetic tape, floppy disk, CD-ROM, optical disk, and the like. Any or all of the foregoing may be referred to as a memory or as an electronic memory.

What is claimed is:

1. A method for conducting an exhibition wherein a visitor having a smart tag visits a plurality of stations comprising:

associating a smart tag reader with each one of a plurality of stations for providing and/or receiving information-bearing electrical signals in a smart tag format, storing exhibitor information in an electronic memory associated with a station, issuing a visitor smart tag containing visitor information, the visitor smart tag including an electronic memory for providing and/or receiving information-bearing electrical signals in the smart tag format, whereby information-bearing electrical signals can be communicated between the station smart tag reader and the visitor smart tag when the visitor smart tag is proximate the station, communicating information-bearing electrical signals between the visitor smart tag and the smart tag reader of a particular station when the visitor smart tag is proximate that particular station, wherein visitor information from the electronic memory of the visitor smart tag is stored in an electronic memory associated with the particular station and/or exhibitor information from the electronic memory of the particular station is stored in the electronic memory of the visitor smart tag; and processing visitor information and exhibitor information from the electronic memory of at least one of the visitor smart tag and the plurality of stations for providing a record thereof.

2. The method of claim 1 further comprising communicating information contained in the information-bearing electrical signals between a computer processor and the smart tag reader for said processing visitor information and exhibitor information.

3. The method of claim 2 wherein said communicating comprises sending information contained in the information-bearing electrical signals via one or more of wire, cable, optical fiber, radio or RF transmission, a local area network (LAN), a wide area network (WAN), and a combination thereof.

4. The method of claim 2 wherein said communicating includes storing the same information in the computer processor and in the electronic memory associated with a particular station.

5. The method of claim 2 wherein said communicating further comprises communicating via a hub between one of:
(a) a central processor and at least one local processor, and
(b) ones of local processors.

6. The method of claim 1 wherein information contained in the information-bearing electrical signals is representative of one or more of the identity of a smart tag, the identity of a visitor, the identity of the station, the identity of an exhibitor, products and/or services of an exhibitor, a data item requested at a station, a date, and time.

7. The method of claim 1 further comprising displaying at a particular station visitor information from a particular visitor smart tag communicated to the smart tag reader of the particular station when that particular visitor smart tag is proximate that particular station.

8. The method of claim 1 further comprising providing the information to be stored in and the information produced from the electronic memory of the visitor smart tag in a form including a permanent number, application specific data and a relational check number representative of the permanent number and/or the application specific number.

9. The method of claim 1 wherein said processing includes processing information in a form including a permanent number, application specific data and a relational check number representative of the permanent number and/or the application specific number.

10. The method of claim 1 wherein said issuing a visitor smart tag comprises issuing a visitor smart tag including an electronic memory and an antenna coupled to the electronic memory for transmitting and/or receiving information-bearing electrical signals in the smart tag format; and wherein said communicating information-bearing electrical signals comprises:

operatively coupling an antenna or an antenna array to a respective one of the smart tag readers for transmitting and/or receiving the information-bearing electrical signals to and/or from a visitor smart tag proximate the respective station associated therewith.

11. The method of claim 10 wherein said operatively coupling includes disposing a plurality of loops of the antenna or antenna array for providing a detection region including a predetermined area of a particular one of the plurality of stations.

12. The method of claim 11 wherein said operatively coupling includes disposing the plurality of loops of the antenna or antenna array on flexible substrates providing a flexible curtain at an access way.

13. The method of claim 11 further comprising one of:
spatially separating the plurality of loops of the antenna or antenna array such that less than about 50% of the effective electromagnetic field region of the respective loops overlap within the detection region, and
temporally separating the plurality of loops of the antenna or antenna array by activating ones of the plurality of loops sequentially in time.

14. The method of claim 1 wherein said processing includes centrally processing in communication with locally processing in communication with the smart tag readers.

15. The method of claim 10 wherein said processing includes providing a human-perceivable indication responsive to the presence of a smart tag within a detection region of the antenna or antenna array.

16. The method of claim 15 wherein said providing a human-perceivable indication includes one of providing a light, an audible indication, an alpha-numeric display, a display on a computer monitor, and a print out.

17. The method of claim 1 further comprising providing a report including processed visitor information and/or processed exhibitor information.

18. The method of claim 17 wherein said providing a report includes providing a document, a paper, an electronic file, a floppy disk, an optical disk, an electronic medium a CD-ROM disk, and/or a report via the Internet.

19. The method of claim 1 further comprising receiving visitor registration information, and storing at least part of the visitor registration information on the visitor smart tag as visitor information.

20. The method of claim 1 further comprising storing exhibitor information in an electronic memory at a station.

21. The method of claim 1 further comprising collecting the visitor smart tag.

22. The method of claim 1 further comprising providing a visual and/or aural greeting message responsive to the processed visitor information.

23. The method of claim 1 wherein said processing further includes:
   granting and/or denying access responsive to the processed visitor information, and/or
   checking out a visitor responsive to the processed visitor information and/or the processed exhibitor information.

24. A system wherein a visitor having a smart tag visits a plurality of stations comprising:
   a smart tag reader associated with each one of a plurality of stations for providing and/or receiving information-bearing electrical signals in a smart tag format,
   means for storing exhibitor information in an electronic memory associated with a station,
   means for issuing a visitor smart tag containing visitor information, the visitor smart tag including an electronic memory for providing and/or receiving information-bearing electrical signals in the smart tag format,
   whereby information-bearing electrical signals can be communicated between the station smart tag reader and the visitor smart tag when the visitor smart tag is proximate the station,
   means for communicating information-bearing electrical signals between the visitor smart tag and the smart tag reader of a particular station when the visitor smart tag is proximate that particular station,
   wherein visitor information from the electronic memory of the visitor smart tag is stored in an electronic memory associated with the particular station and/or exhibitor information from the electronic memory of the particular station is stored in the electronic memory of the visitor smart tag; and
   means for processing visitor information and exhibitor information from the electronic memory of at least one of the visitor smart tag and the plurality of stations for providing a record thereof.

25. The system of claim 24 further comprising means for communicating information contained in the information-bearing electrical signals between a computer processor and the smart tag reader for said means for processing visitor information and exhibitor information.

26. The system of claim 24 wherein said means for communicating comprises one or more of wire, cable, optical fiber, radio or RF transmission, a local area network (LAN), a wide area network (WAN), and a combination thereof.

27. The system of claim 24 wherein said means for communicating includes means for storing the same information in the computer processor and in the electronic memory associated with a particular station.

28. The system claim 24 wherein said means for communicating further comprises means for communicating via a hub between one of:
   (a) a central processor and at least one local processor, and
   (b) ones of local processors.

29. The system of claim 24 wherein information contained in the information-bearing electrical signals is representative of one or more of the identity of a smart tag, the identity of a visitor, the identity of the station, the identity of an exhibitor, products and/or services of an exhibitor, a data item requested at a station, a date, and time.

30. The system of claim 24 further comprising means for displaying at a particular station visitor information from a particular visitor smart tag communicated to the smart tag reader of the particular station when that particular visitor smart tag is proximate that particular station.

31. The system of claim 24 further comprising means for providing the information to be stored in and the information produced from the electronic memory of the visitor smart tag in a form including a permanent number, application specific data and a relational check number representative of the permanent number and/or the application specific number.

32. The system of claim 24 wherein said means for processing processes information in a form including a permanent number, application specific data and a relational check number representative of the permanent number and/or the application specific number.

33. The system of claim 24 further wherein the visitor smart tag includes an antenna coupled to the electronic memory for transmitting and/or receiving information-bearing electrical signals in a smart tag format, and wherein said means for communicating comprises:
   an antenna or antenna array operatively coupled to a respective one of the smart tag readers for transmitting and/or receiving the information-bearing electrical signals to and/or from a visitor smart tag proximate the respective station associated therewith.

34. The system of claim 33 wherein said antenna or antenna array includes a plurality of loops disposed for providing a detection region including a predetermined area of a particular one of the plurality of stations.

35. The system of claim 34 wherein said plurality of loops of said antenna or antenna array are disposed on flexible substrates providing a flexible curtain at an access way.

36. The system of claim 34 wherein the plurality of loops of said antenna or antenna array are one of:
   spatially separated such that less than about 50% of the effective electromagnetic field region of the respective loops overlaps within the detection region, and
   temporally separated by activating ones of the plurality of loops of said antenna or antenna array sequentially in time.

37. The system of claim 24 wherein said means for processing includes a central processor in communication with one or more local processors in communication with the smart tag readers.

38. The system of claim 33 wherein said means for processing provides a human-perceivable indication responsive to the presence of a smart tag within the detection region of said antenna or antenna array.

39. The system of claim 38 wherein said providing a human-perceivable indication includes one of providing a light, an audible indication, an alphanumeric display, a display on a computer monitor, and a print out.

40. The system of claim 24 further comprising means for providing a report including processed visitor information and/or processed exhibitor information.

41. The system of claim 40 wherein said report includes a document, a paper, an electronic file, a floppy disk, an optical disk, an electronic medium, a CD-ROM disk, and/or a report via the Internet.

42. The system of claim 24 further comprising means for receiving visitor registration information, wherein at least part of the visitor registration information is stored in the visitor smart tag as visitor information.

43. The system of claim 24 further comprising means for storing exhibitor information in an electronic memory at a station.

44. The system of claim 24 further comprising means for collecting the visitor smart tag.

45. The system of claim 24 wherein said means for processing provides a visual and/or aural greeting message responsive to the visitor information.

46. The system of claim 24 wherein said means for processing is responsive to the visitor information for granting and/or denying access.

47. The system of claim 24 wherein said means for processing is responsive to the visitor information and/or the exhibitor information for checking out a visitor.

48. A system wherein a visitor having a smart tag visits a plurality of stations comprising:
- a plurality of stations each including an electronic memory having exhibitor information stored therein for providing and/or receiving information-bearing signals proximate thereto;
- a plurality of smart tag readers associated with respective ones of the plurality of stations for providing and/or receiving the information-bearing signals in a smart tag format;
- a visitor smart tag including an electronic memory containing visitor information for providing and/or receiving information-bearing signals in the smart tag format,
- wherein information-bearing signals are communicated between the smart tag reader of a particular station and the visitor smart tag when the visitor smart tag is proximate the particular station;
- wherein visitor information from the electronic memory of the visitor smart tag is stored in the electronic memory associated with the particular station and/or exhibitor information from the electronic memory of the particular station is stored in the electronic memory of the visitor smart tag,
- a processor for processing visitor information and exhibitor information from the electronic memory of at least one of the visitor smart tag and the plurality of stations for storing a record thereof in a relational data base; and
- means coupled to said processor for providing a tangible record including visitor information and exhibitor information.

49. The system of claim 48 further comprising one or more of wire, cable, optical fiber, radio or RF transmission, a local area network (LAN), a wide area network (WAN), and a combination thereof, for communicating information between the plurality of stations and the processor.

50. The system claim 48 wherein said processor comprises one of:
 (a) a central processor in communication with at least one local processor; and
 (b) a plurality of local processors in communication with each other.

51. The system of claim 48 wherein information contained in the information-bearing signals is representative of one or more of the identity of the visitor smart tag, the identity of a visitor, the identity of a station, the identity of an exhibitor, products and/or services of an exhibitor, a data item requested at a station, a date, and time.

52. The system of claim 48 further comprising means for displaying at a particular station visitor information from the visitor smart tag communicated to the smart tag reader of the particular station when the visitor smart tag is proximate that particular station.

53. The system of claim 48 wherein information stored in the electronic memory of the visitor smart tag includes a permanent number, application specific data and a relational check number representative of the permanent number and/or the application specific number.

54. The system of claim 48 wherein said processor processes information including a permanent number, application specific data and a relational check number representative of the permanent number and/or the application specific number.

55. The system of claim 48 wherein information stored in records of the relational database includes a permanent number, application specific data and a relational check number representative of the permanent number and/or the application specific number.

56. The system of claim 48 wherein the visitor smart tag includes an antenna coupled to the electronic memory for transmitting and/or receiving information-bearing signals in the smart tag format,
- wherein the plurality of stations each includes an antenna or antenna array operatively associated with the smart tag reader for transmitting and/or receiving information-bearing signals proximate thereto, and
- wherein the information-bearing signals are communicated between the antenna or antenna array of the smart tag reader of a particular station and the antenna of the visitor smart tag when the visitor smart tag is proximate the particular station.

57. The system of claim 56 wherein said antenna or antenna array includes a plurality of loops disposed for providing a detection region including a predetermined area of a particular one of the plurality of stations, wherein the plurality of loops are spatially separated such that less than about 50% of the effective electromagnetic field region of the respective loops overlaps within the detection region.

58. The system of claim 48 further comprising a display at ones of the plurality of stations providing a human perceivable indication including visitor information at a particular station in response to the information-bearing signals communicated between the smart tag reader of the particular station and the visitor smart tag when the visitor smart tag is proximate the particular station.

59. The system of claim 58 wherein said human perceivable indication includes one of a light, an audible indication, an alpha-numeric display, a display on a computer monitor, and a print out.

60. The system of claim 48 wherein said tangible record includes a document, a paper, an electronic file, a floppy disk, an optical disk, an electronic medium, and/or a CD-ROM disk.

61. The system of claim 48 further comprising means for receiving at least one of visitor information and exhibitor information via a communication network, wherein the visitor information is stored in the relational database of said processor and wherein the exhibitor information is stored in the electronic memory of a one of said plurality of stations.

62. The system of claim 39 further comprising means for providing a report including visitor information and/or exhibitor information via the Internet.

63. The system of claim 39 further comprising means for collecting the visitor smart tag.

64. The system of claim 39 wherein said means for processing provides a visual and/or aural greeting message responsive to the visitor information.

65. The system of claim 39 wherein said means for processing is responsive to the visitor information for granting and/or denying access.

66. The system of claim 39 wherein said means for processing is responsive to the visitor information and/or the exhibitor information for checking out a visitor.

67. A system for reading and/or writing to a smart tag comprising:

a smart tag reader for providing and/or receiving information-bearing signals in a smart tag format;

an antenna operatively coupled to said smart tag reader for transmitting and/or receiving the information-bearing signals in a smart tag format;

a touch screen for displaying and for entering information, and a processor for processing information, wherein said processor is operatively coupled to said smart tag reader for processing information represented in the information-bearing signals received from a smart tag via the antenna and for causing the smart tag reader to transmit information-bearing signals to the smart tag via the antenna, and wherein said processor is operatively coupled to said touch screen for displaying information represented in the information-bearing signals received from a smart tag via the antenna and for receiving information entered on the touch screen.

68. The system of claim 67 further comprising a printer coupled to said processor for providing a report including one or more of information represented in the information-bearing signals received from a smart tag, information represented in the information-bearing signals transmitted to the smart tag, information displayed on said touch screen, and/or information entered on said touch screen.

69. A method for conducting an exhibition wherein a visitor having a smart tag visits a plurality of stations each including a smart tag reader, the method comprising:

registering a visitor including storing visitor information in a visitor database;

issuing a visitor smart tag containing visitor information, the visitor smart tag providing at least the visitor information in a smart tag format;

registering exhibitors including storing exhibitor information;

storing exhibitor information of a registered exhibitor in a memory of one of a number of respective stations, wherein each respective station has a smart tag reader associated therewith for receiving information in the smart tag format;

whereby information can be communicated between the visitor smart tag and the station when the visitor smart tag is proximate the station, providing the respective stations including stored exhibitor information of respective registered exhibitors;

communicating information between the visitor smart tag and a particular station when the visitor smart tag is proximate that particular station, wherein visitor information from the visitor smart tag is stored in a memory associated with the particular station;

collecting visitor information and exhibitor information from ones of the respective stations after one or more visitor smart tags have communicated with a respective station;

processing the visitor information and exhibitor information collected from ones of the respective stations in relation to visitor information stored in the database; and providing a report including processed exhibitor information representative of stations visited by a registered visitor smart tag and/or providing a report including processed visitor information representative of registered visitor smart tags visiting a respective station.

70. The method of claim 69 wherein said registering a visitor and/or said registering exhibitors is performed via the Internet.

71. The method of claim 70 wherein said registering a visitor and/or said registering exhibitors is performed prior to an exhibition and/or during an exhibition.

72. The method of claim 69 wherein said issuing a visitor smart tag includes issuing a human-readable badge.

73. The method of claim 69 wherein said providing a report including processed exhibitor information includes providing the report to a registered visitor and/or wherein said providing a report including processed visitor information includes providing the report to a registered exhibitor.

74. The method of claim 69 wherein said providing a report including processed exhibitor information and/or providing a report including processed visitor information includes providing an electronic file, a floppy disk, an optical disk, an electronic medium, a CD-ROM disk, and/or a report via the Internet.

75. The method of claim 69 further comprising providing a report including processed exhibitor information representative of stations visited by registered visitor smart tags and/or processed visitor information representative of registered visitor smart tags visiting respective stations.

* * * * *